(12) United States Patent
Wang et al.

(10) Patent No.: US 10,931,419 B2
(45) Date of Patent: Feb. 23, 2021

(54) METHOD AND DEVICE FOR TRANSMITTING AND RECEIVING SIGNALS

(71) Applicant: Samsung Electronics Co., Ltd., Gyeonggi-do (KR)

(72) Inventors: Yi Wang, Beijing (CN); Shichang Zhang, Beijing (CN); Jingxing Fu, Beijing (CN); Yingyang Li, Beijing (CN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/772,333

(22) PCT Filed: Oct. 28, 2016

(86) PCT No.: PCT/KR2016/012251
§ 371 (c)(1),
(2) Date: Apr. 30, 2018

(87) PCT Pub. No.: WO2017/074101
PCT Pub. Date: May 4, 2017

(65) Prior Publication Data
US 2018/0323923 A1    Nov. 8, 2018

(30) Foreign Application Priority Data

Oct. 30, 2015  (CN) .......................... 201510729782.7
Feb. 24, 2016  (CN) .......................... 201610102829.1

(51) Int. Cl.
*H04L 5/00*    (2006.01)
*H04W 48/16*    (2009.01)
(Continued)

(52) U.S. Cl.
CPC ........ *H04L 5/0048* (2013.01); *H04J 11/0073* (2013.01); *H04J 11/0076* (2013.01);
(Continued)

(58) Field of Classification Search
CPC ..... H04L 5/001; H04L 5/0035; H04L 5/0048; H04L 5/005; H04L 5/0053; H04W 16/14;
(Continued)

(56) References Cited

U.S. PATENT DOCUMENTS

2011/0170435 A1    7/2011  Kim et al.
2011/0286440 A1   11/2011  Chung et al.
(Continued)

FOREIGN PATENT DOCUMENTS

CN    102237951    11/2011
CN    102308545    1/2012
(Continued)

OTHER PUBLICATIONS

PCT/ISA/210 Search Report issued on PCT/KR2016/012251 (pp. 4).
(Continued)

*Primary Examiner* — Saad A. Waqas
(74) *Attorney, Agent, or Firm* — The Farrell Law Firm, P.C.

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure relates to a pre-5th-Generation (5G) or 5G communication system to be provided for supporting higher data rates Beyond 4th-Generation (4G) communication system such as Long Term Evolution (LTE). Embodiments of the present disclosure provide a method for transmitting signals. The method includes: determining, by a communication node, that resources of a DRS and resources of other types of reference signals are overlapped; and selecting, by the communication node, at least one type of signal from the DRS and the other types of reference signals according to a (Continued)

predefined mode and transmitting the selected signal. Embodiments of the present disclosure may further disclose a corresponding method and device for receiving signals, a method and device for determining transmission power of the reference signals and a method for transmitting the DRS in a DL transmission burst including the data. With embodiments of the present disclosure, the confusion of the measurement of the DRS and the measurement of other types of reference signals may be solved.

4 Claims, 19 Drawing Sheets

(51) Int. Cl.
  *H04J 11/00* (2006.01)
  *H04W 16/14* (2009.01)
  *H04W 56/00* (2009.01)
  *H04W 72/04* (2009.01)
  *H04B 7/06* (2006.01)

(52) U.S. Cl.
  CPC .......... *H04L 5/0035* (2013.01); *H04L 5/0053* (2013.01); *H04W 16/14* (2013.01); *H04W 48/16* (2013.01); *H04W 56/0015* (2013.01); *H04B 7/0626* (2013.01); *H04L 5/001* (2013.01); *H04L 5/005* (2013.01); *H04W 72/0446* (2013.01)

(58) Field of Classification Search
  CPC ............. H04W 48/16; H04W 56/0015; H04W 72/0446; H04B 7/0626; H04J 11/0073; H04J 11/0076
  See application file for complete search history.

(56) References Cited

U.S. PATENT DOCUMENTS

| | | |
|---|---|---|
| 2013/0070719 A1 | 3/2013 | Xu et al. |
| 2015/0215847 A1* | 7/2015 | Yie .................... H04W 48/08 455/434 |
| 2015/0256312 A1 | 9/2015 | Yi et al. |
| 2015/0312784 A1 | 10/2015 | You et al. |
| 2015/0349867 A1 | 12/2015 | Guo et al. |
| 2015/0358094 A1 | 12/2015 | Yi et al. |
| 2016/0345206 A1* | 11/2016 | Yerramalli .......... H04W 72/042 |
| 2017/0070312 A1 | 3/2017 | Yi et al. |
| 2017/0078953 A1 | 3/2017 | You et al. |
| 2017/0093542 A1* | 3/2017 | Li ..................... H04L 5/0048 |
| 2017/0099126 A1* | 4/2017 | Yoo ................... H04L 5/0048 |
| 2017/0111888 A1* | 4/2017 | Dinan ................ H04W 72/042 |
| 2018/0069660 A1* | 3/2018 | Yi ..................... H04L 1/0013 |
| 2018/0331774 A1* | 11/2018 | Ye .................... H04J 11/0069 |

FOREIGN PATENT DOCUMENTS

| | | |
|---|---|---|
| CN | 103378962 | 10/2013 |
| CN | 103795491 | 5/2014 |
| CN | 104756576 | 7/2015 |
| CN | 104955018 | 9/2015 |
| CN | 104981994 | 10/2015 |
| EP | 2 579 664 | 4/2013 |
| WO | WO 2013/152731 | 10/2013 |
| WO | WO 2015133825 | 9/2015 |
| WO | WO 2015160171 | 10/2015 |
| WO | WO 2016/201771 | 12/2016 |

OTHER PUBLICATIONS

PCT/ISA/237 Written Opinion issued on PCT/KR2016/012251 (pp. 6).
Intel Corporation, on the LAA DRS design and transmission, R1-155848, 3GPP TSG-RAN WG1 #82bis, Malmo, Sweden, Sep. 26, 2015, pp. 6.
Ericsson, RAN1 Chairman's Notes, 3GPP TSG RAN WG1 Meeting #69, May 21-25, 2012, 35 pages.
Chinese Office Action dated Sep. 30, 2020 issued in counterpart application No. 201610102829.1, 12 pages.

* cited by examiner

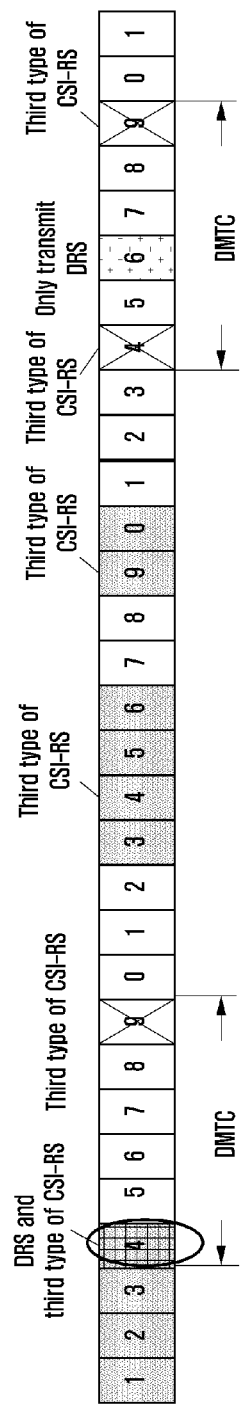
[Fig. 1]

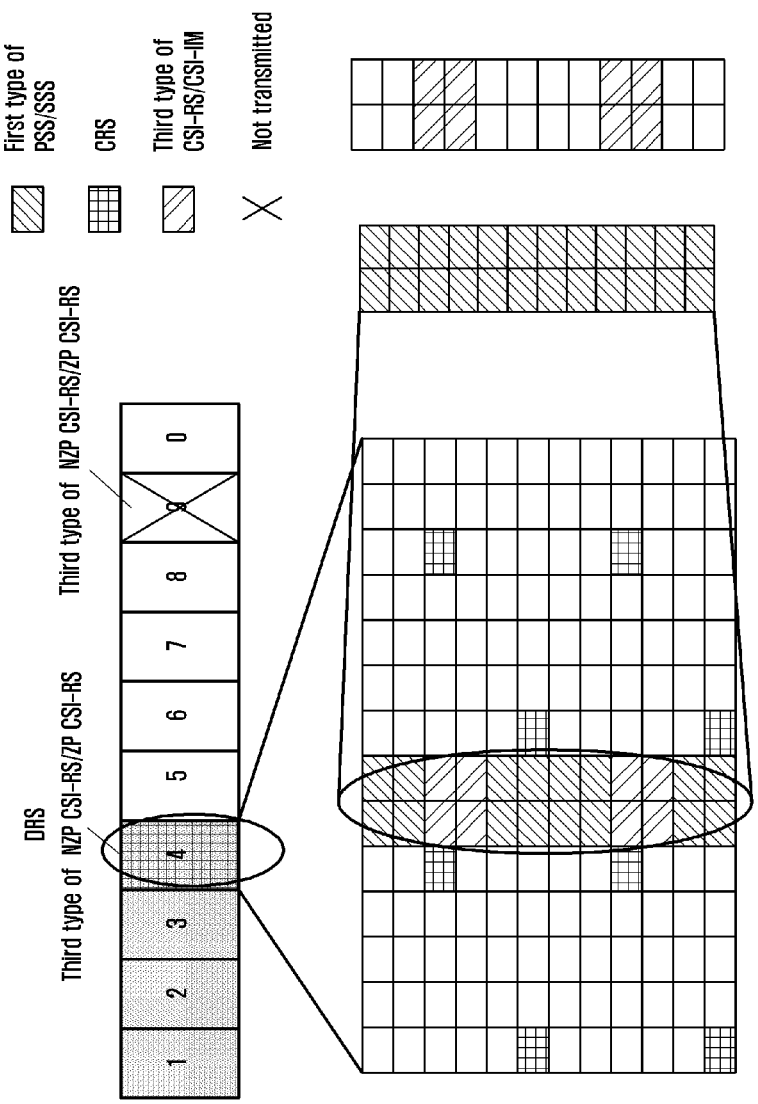
[Fig. 2]

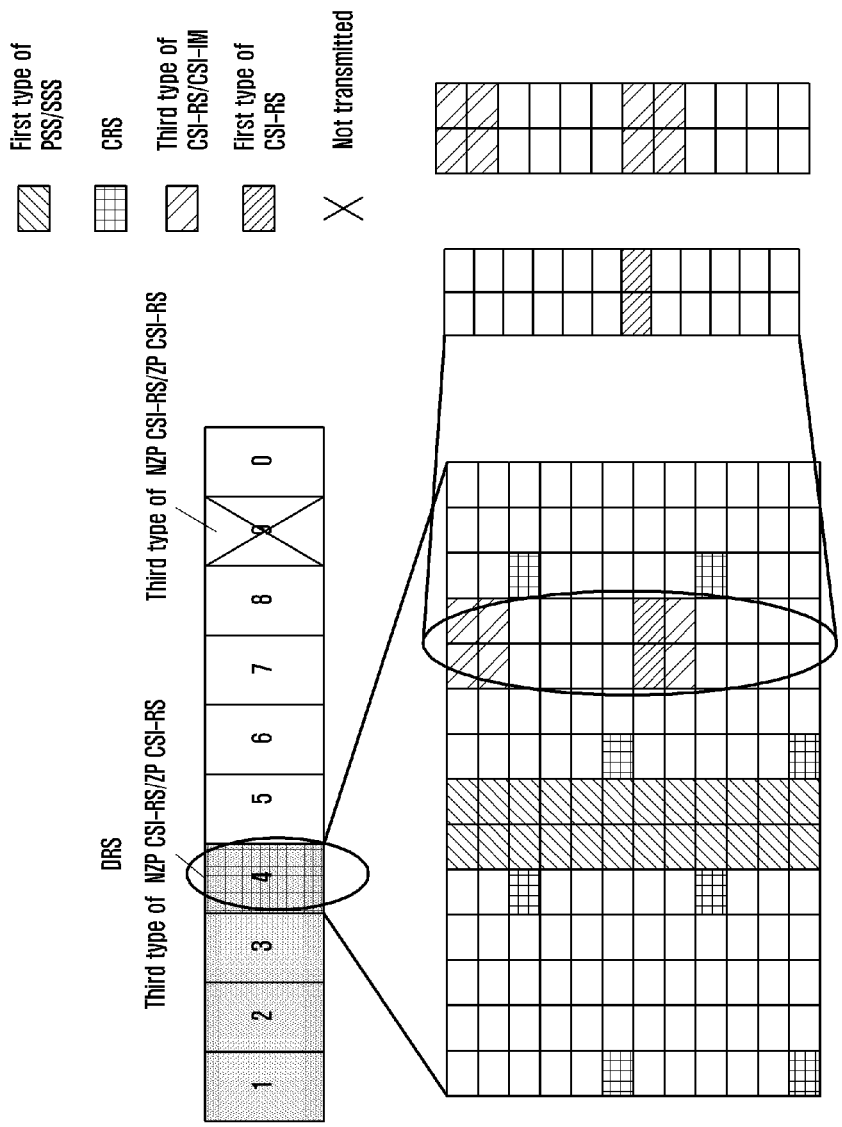
[Fig. 3]

[Fig. 4]
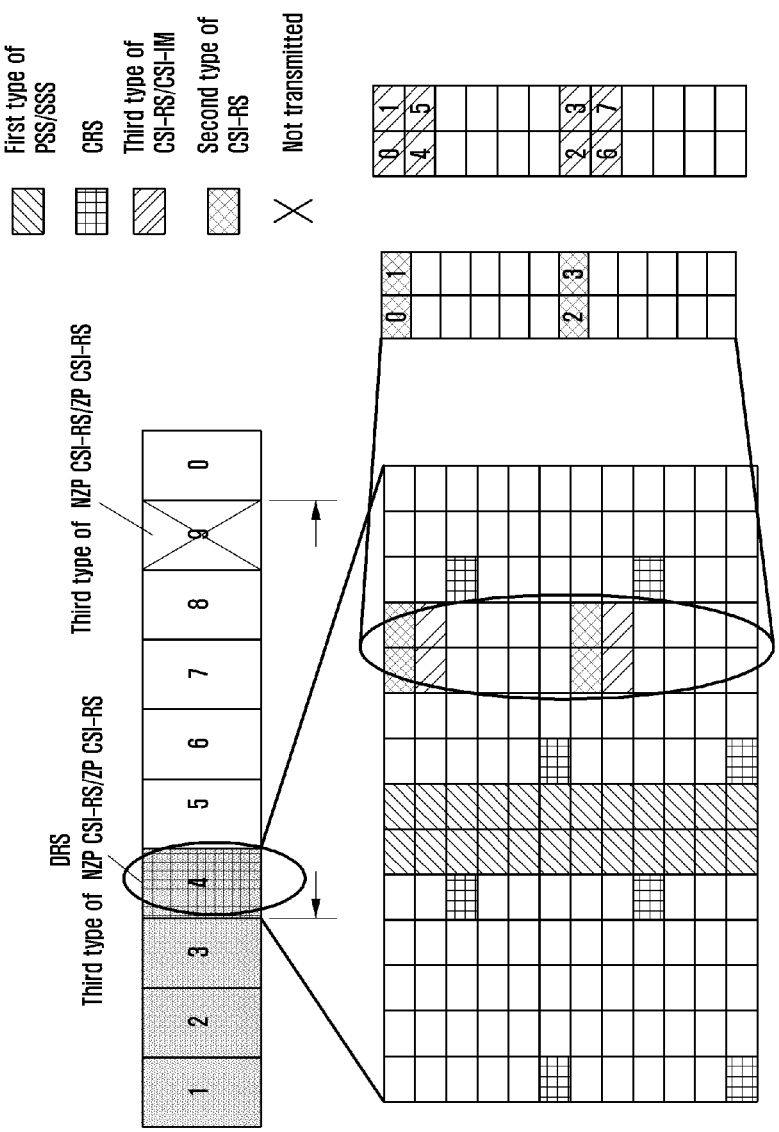

[Fig. 5]
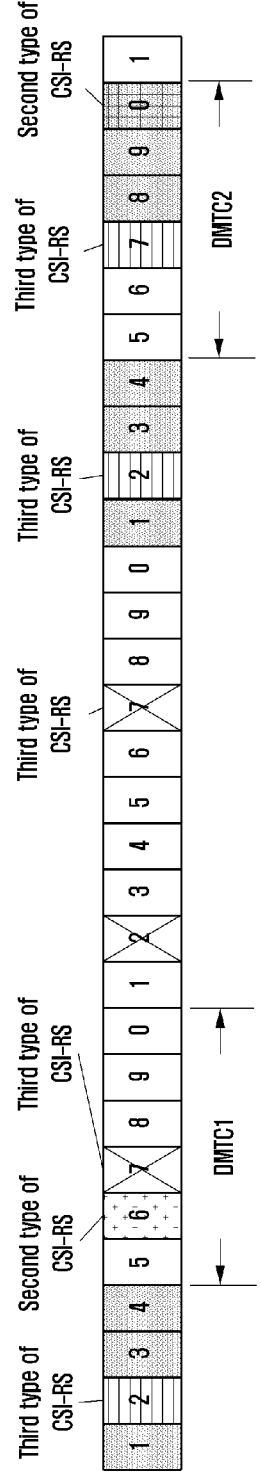

[Fig. 6]
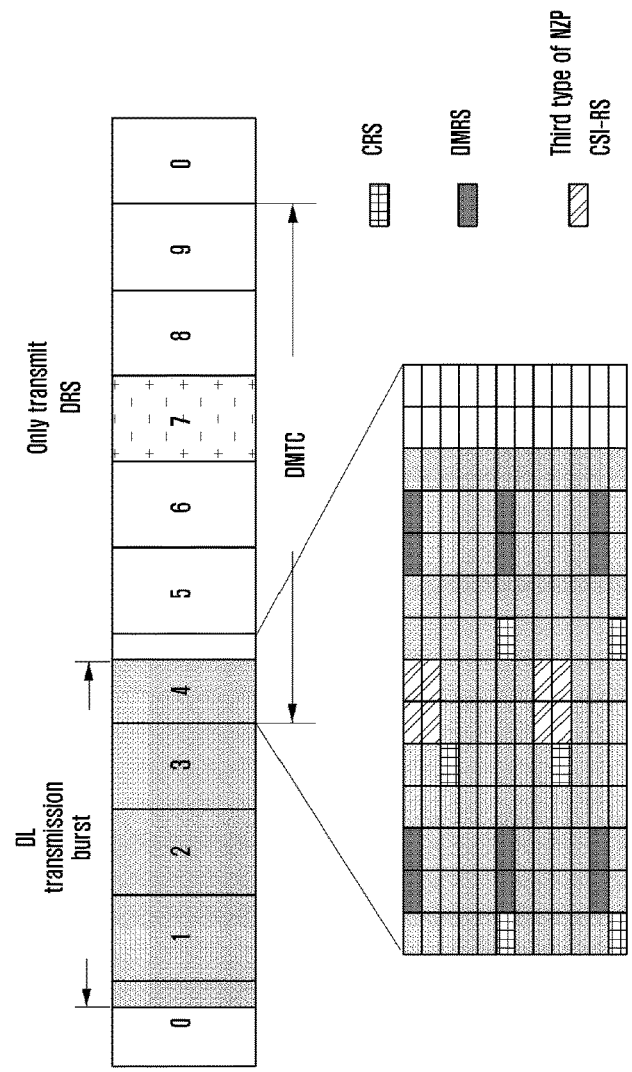
[Fig. 7a]
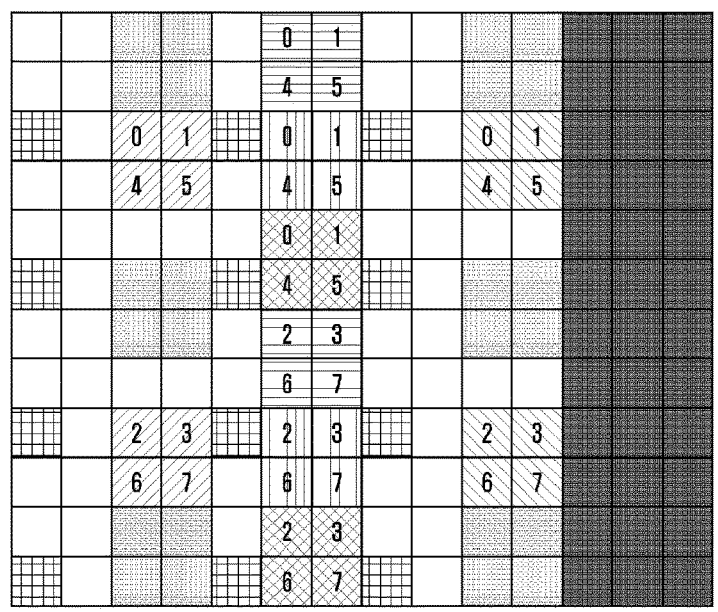

[Fig. 7b]
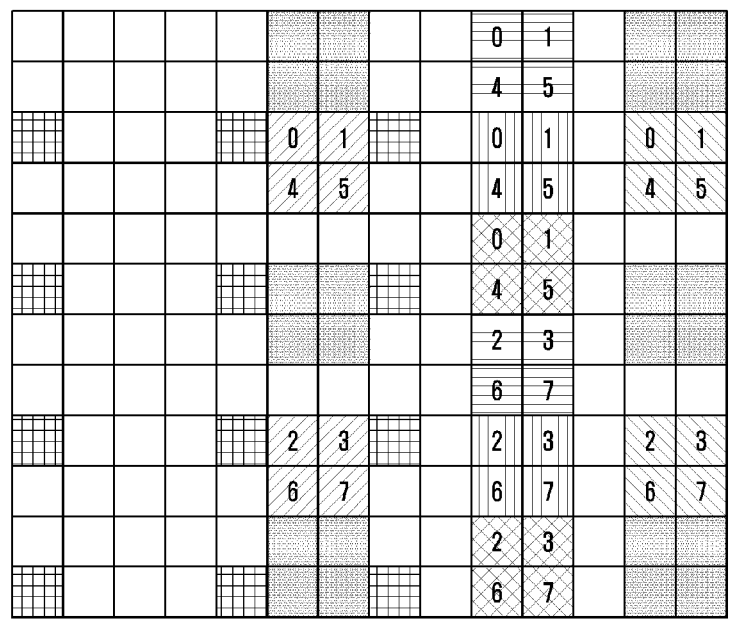

[Fig. 8]
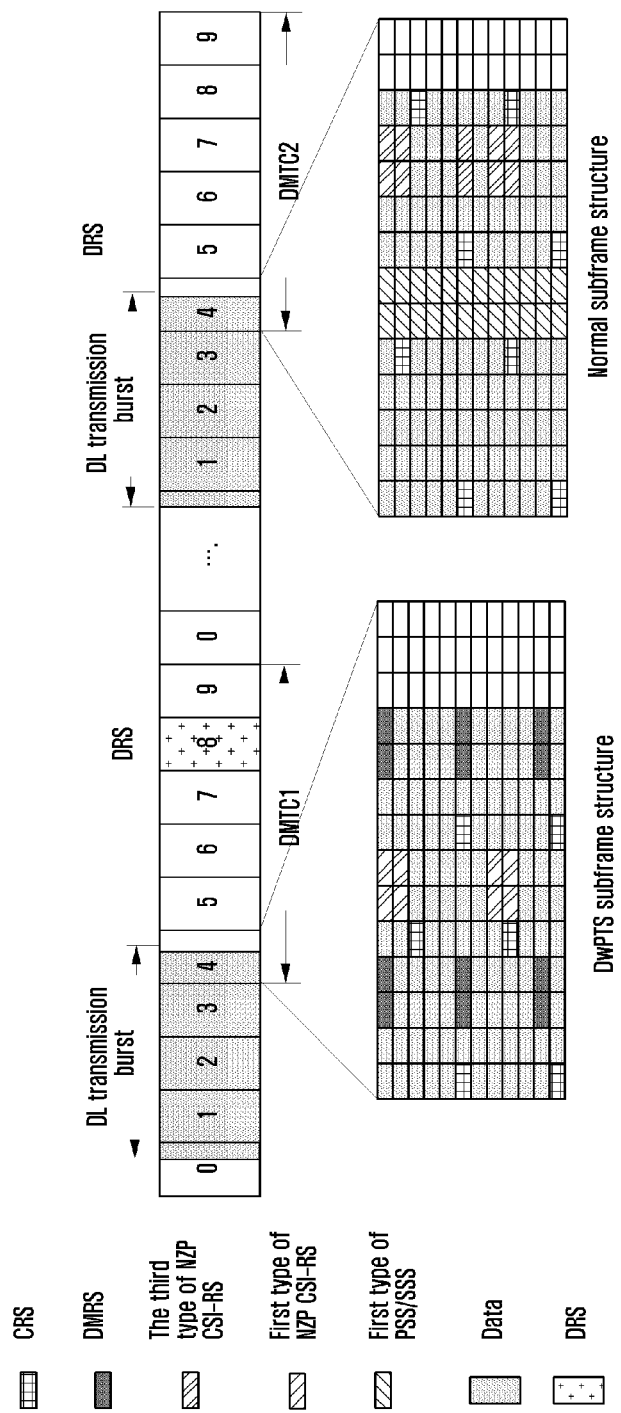

[Fig. 9]
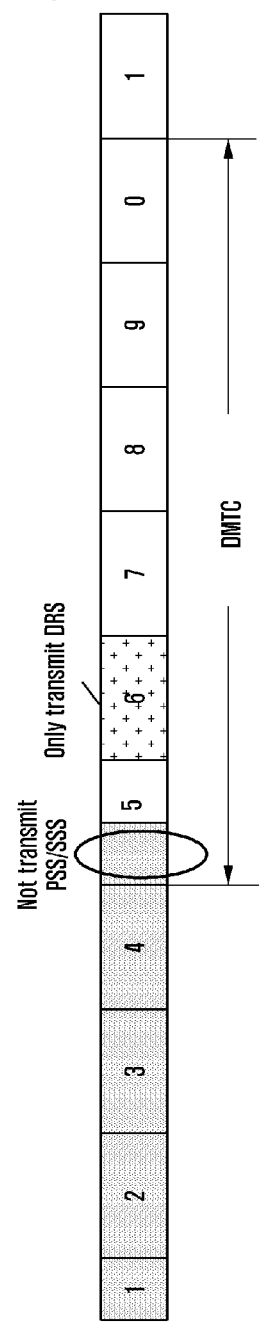

[Fig. 10]
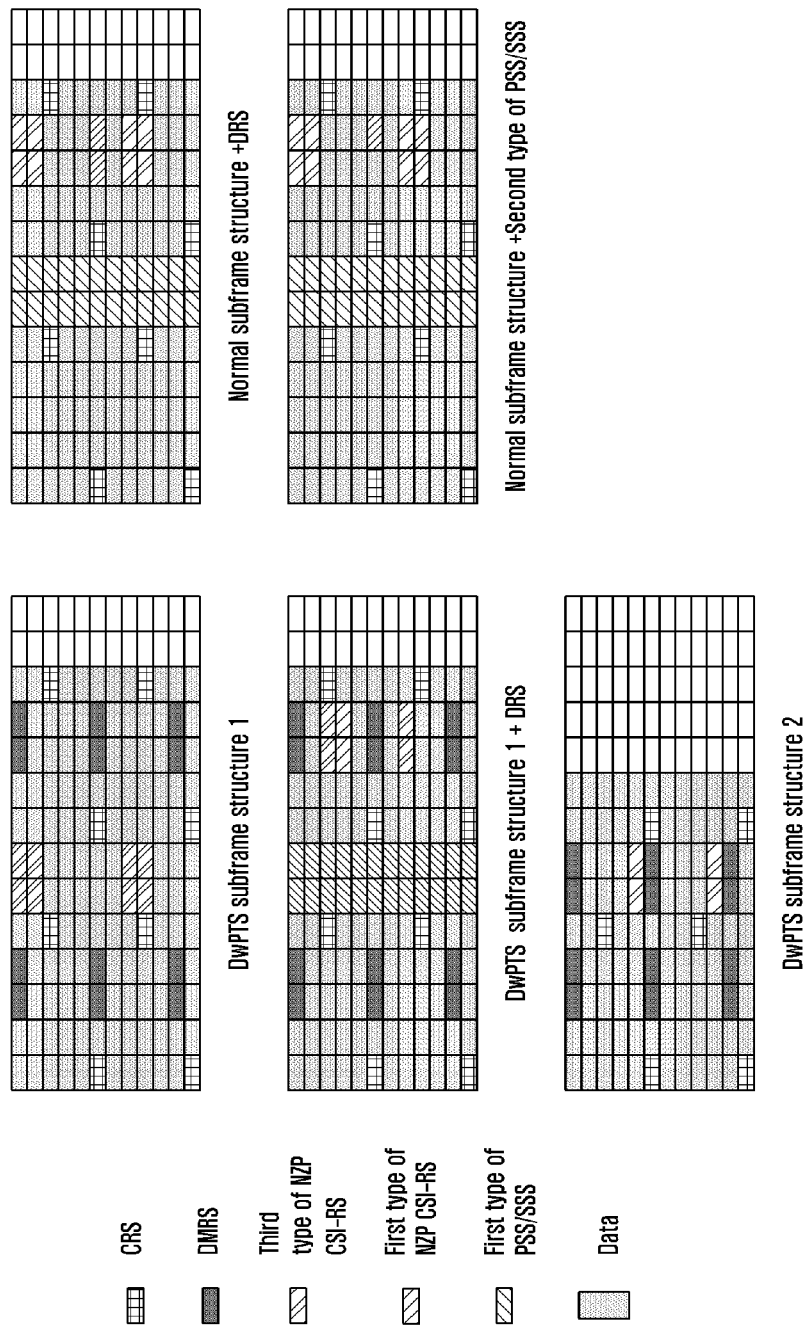

[Fig. 11a]
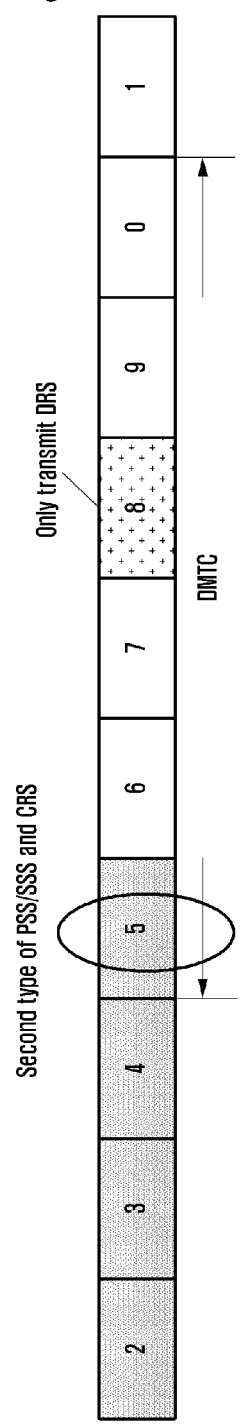

[Fig. 11b]
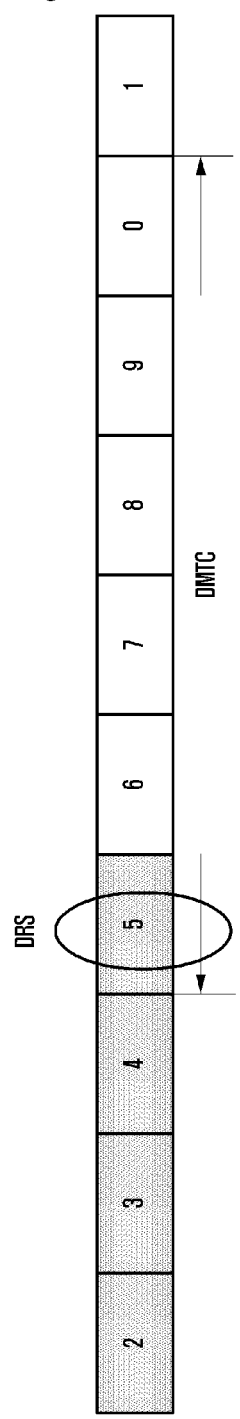

[Fig. 12]
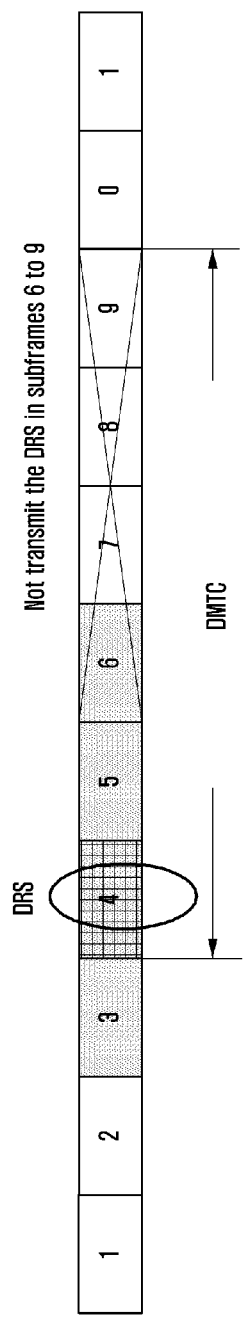

[Fig. 13]
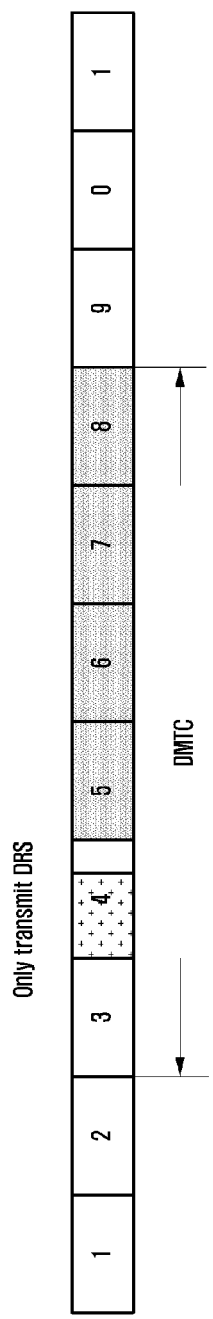

[Fig. 14]
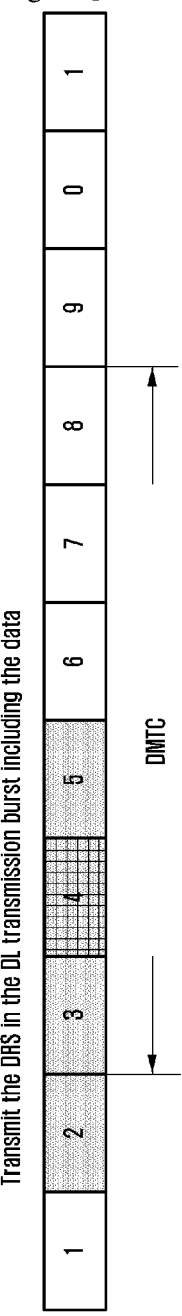

[Fig. 15]
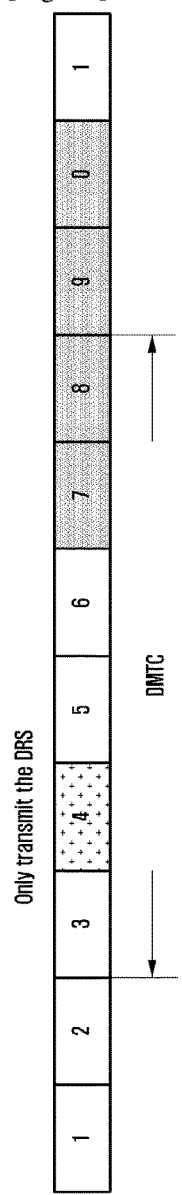
[Fig. 16]
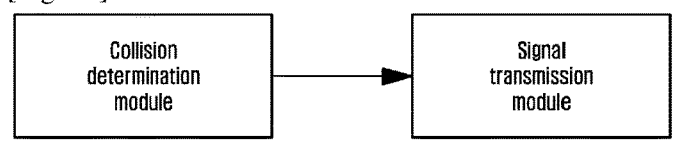
[Fig. 17]
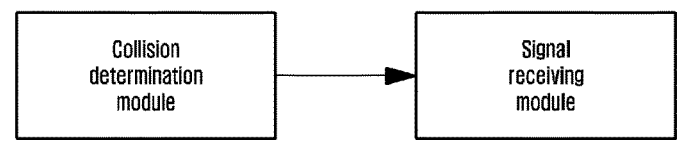
[Fig. 18]
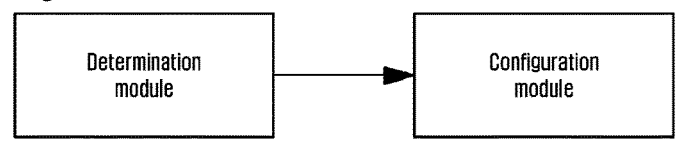

[Fig. 19]
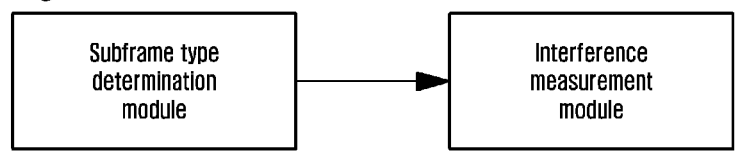
[Fig. 20]
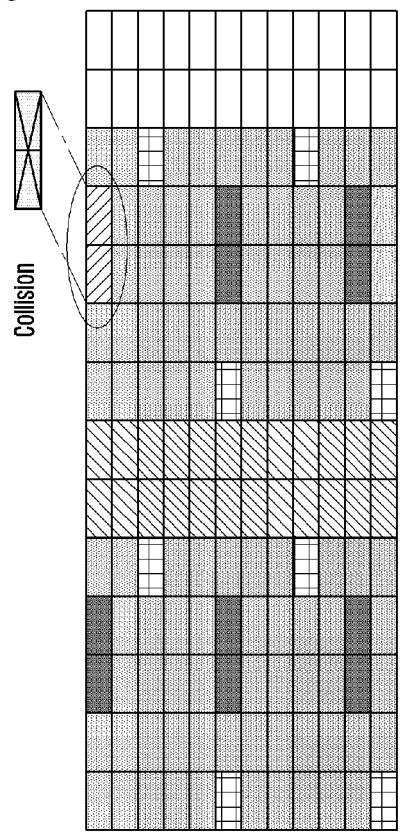
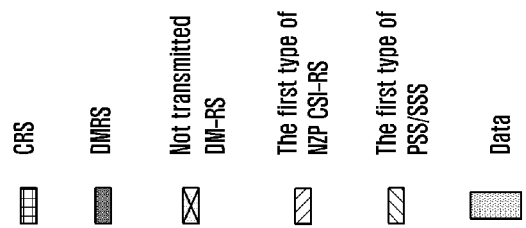

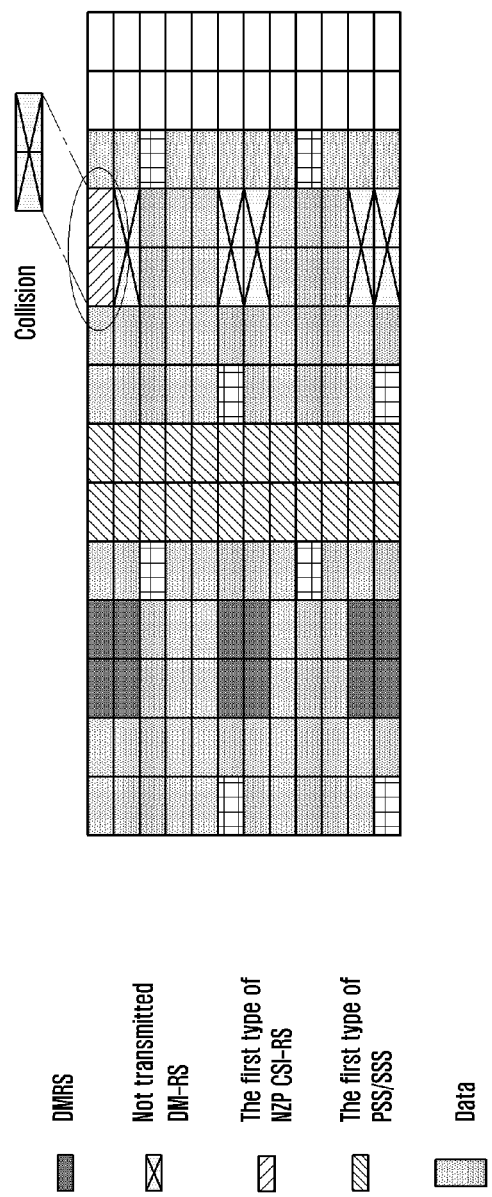
[Fig. 21]

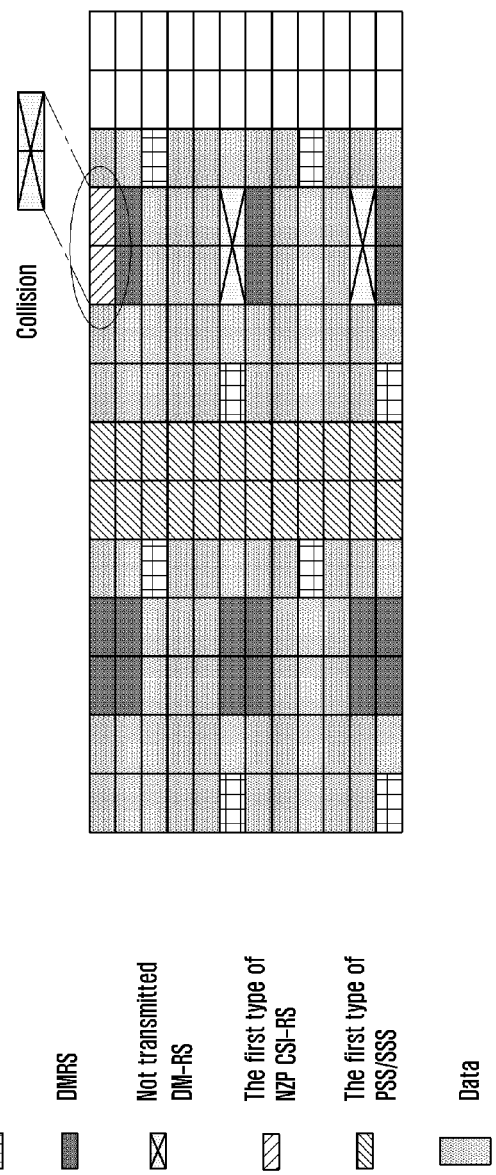
[Fig. 22]

METHOD AND DEVICE FOR TRANSMITTING AND RECEIVING SIGNALS

PRIORITY

This application is a National Phase Entry of PCT International Application No. PCT/KR2016/012251 which was filed on Oct. 28, 2016, and claims priority to Chinese Patent Application Nos. 201510729782.7 and 201610102829.1, which were filed on Oct. 30, 2015 and Feb. 24, 2016, respectively, the content of each of which is incorporated herein by reference.

TECHNICAL FIELD

The present disclosure relates to a field of mobile communication technologies, specifically, the present disclosure relates to methods and devices for transmitting and receiving signals, and more particularly, to methods and devices for transmitting and receiving signals on an unlicensed band.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As the conflict between outbreak of people's demands on high broadband wireless services and scarcity of spectrum resources becomes more and more severe, the mobile operator begins to consider taking unlicensed bands as supplement of licensed bands. Therefore, research on deploying the Long Term Evolution (LTE) on the unlicensed bands is on the agenda. The 3rd Generation Partnership Project (3GPP) has started to research, under the premise of not obviously affecting other technologies on the unlicensed bands, how to effectively improve utilization of frequency spectrum of the whole network via effective carrier aggregation on the unlicensed bands and licensed bands.

Generally, the unlicensed bands may have been allocated for other purposes, such as Wireless Fidelity (WiFi) of the radar or the 802.11 series. Therefore, the interference level of the unlicensed band has the uncertainty, resulting in that it is difficult to ensure the Quality of Service (QoS) of the LTE transmission. However, the unlicensed band may be used in data transmission with low QoS requirement. The LTE system deployed on the unlicensed band may be called a Licensed-Assisted Access (LAA) system. How to avoid mutual interference between the LAA system and other wireless systems, such as the radar or WiFi on the unlicensed band is a key issue. Clear Channel Assessment (CCA) is a mechanism commonly adopted on the unlicensed band to avoid the collision. A Station (STA) must detect a wireless channel before transmitting signals, may occupy the wireless channel and transmit the signals after detecting that the wireless channel is idle. The LAA also should follow a similar mechanism to ensure that the interference with other signals is relatively small. An easier method is that the LAA device (a base station or end user) is dynamically turned on or turned off according to the result of the CAA. That is, the LAA performs the transmission when the channel is idle and does not perform the transmission when the channel is busy. This mechanism may be called Listen Before Talk (LBT).

In the LTE system, channel measurement is a very important part. For instance, Radio resource management (RRM) measurement, including Reference Signal Receiving Power (RSRP) measurement and Reference Signal Receiving Quality (RSRQ) measurement or other measurements, which may reflect the quality of the carrier, may provide reference information for mobility management, etc., of the LTE system. In the existing LTE system, the RRM measurement is based on a Cell-specific reference signal (CRS), a Channel State Information-Reference Signal (CSI-RS) or a Discovery Reference Signal (DRS). With the evolution of the LTE system, new pilot signal may be used to implement the measurement. When the measurement is performed, the UE should have obtained Identity (ID) information of a corresponding cell and at least estimated synchronization information. Therefore, first, the UE performs the RRM measurement based on a Primary Synchronization Signal (PSS)/Secondary Synchronization Signal (SSS), or other reference signals including information of a recognizable cell and a reference signal, from which estimated time/frequency domain synchronization information may be obtained. Then, the UE performs the channel measurement based on the CRS, CSI-RS or other reference signals. This type of channel measurement not only may be applied to the measurement of a serving cell, but also may be applied to the measurement of a neighbor cell. In the LTE system, a Discovery Reference Signal Measurement Timing Configuration (DMTC window) is defined to indicate that the UE detects a Discovery Reference Signal (DRS) in a corresponding time window. The UE assumes that that the DRS may be detected in a DMTC window.

In the LAA system, especially the LAA system based on the LBT, it cannot be ensured that these reference signals may be always transmitted in a fixed period. For instance, the base station does not always pass the CCA detection each time prior to the DMTC window. Therefore, the base station only can drop the transmission of the DRS in this DMTC window. In order to increase the probability of transmitting the DRS, the duration of the DRS should be shorted, and in each DMTC window, candidate locations where the DRS appears, should be increased. For instance, the duration of the DMTC window is 6 ms, the duration of the DRS is 1 ms, and the candidate locations where the DRS appears, are i ms, i=1, 2, 3, 4, 5, 6. When the result of the CCA performed by the base station before any of the six candidate locations in the DMTC window is positive, the base station may transmit the DRS on a corresponding candidate location. In order to ensure the transmission probability of the DRS and avoid affecting other communication systems of the unlicensed band, the LBT mechanism of the DRS may be different from the transmission of the normal data. For instance, the DRS may adopt a relatively faster LBT mechanism and may transmit the data with only one CCA. However, the normal data transmission adopts a Load Based Equipment (LBE) mechanism, which is similar to the WiFi. For instance, the transmission of the data requires multiple idle CCA timeslots. Certainly, when the base station has occupied the channel and begun to transmit the data before the DMTC window, the base station may transmit the DRS in subframes of a same Down Link (DL) transmission burst, which fall in the DMTC window. Then, the base station needs not to perform the CCA detection.

Further, in the LAA system, in order to increase the transmission probability of the reference signal for measuring the CSI, a mechanism that the CSI-RS in the DRS may be used to measure the CSI is introduced.

It should be noted that the location of the DRS in the DMTC window is variable. Each signal in the DRS, such as the PSS/SSS and CSI-RS may collide with other periodically-transmitted signals. For instance, when the DRS may appear in the subframe 1 to the subframe 6, the DRS may collide with signals transmitted in the subframe 1 to subframe 6. For another instance, when the DRS is transmitted in the subframe 2, the DRS may collide with periodic CSI-RS on corresponding time-frequency resources configured on the subframe 2. A simple and efficient method is required to solve the collision problem of different signals.

In the LAA system, since the moment that the bases station passes the CCA detection is in the middle of a subframe, the time point that the base station begins to transmit the signal is in the middle of the subframe. The subframe is called a partial subframe from which the DL transmission burst begins. Since the transmission of each DL transmission burst of the base station is limited by the maximum channel occupancy time, such as 4 ms, the ending location of each DL transmission burst shall not be on the edge of the subframe, which is called a partial subframe that at which DL transmission burst ends. Whether to transmit the signals with specific functions, such as the DRS, or the PSS/SSS/CRS of the subframe 0/5 in the partial subframes should be well designed. Not only the transmission of signals with the specific functions should be ensured, but also the influence of the transmission of these signals on the measurement of a UE in a local cell or a neighbor cell should be avoided.

It should be noted that the above introduction of the background is just for clearly and completely describing the technical solution of the present disclosure and the background is described for the convenience of the understanding of those skilled in the art of the present disclosure. These technical solutions cannot be considered to be well known by those skilled in the art of the present disclosure only because these technical solutions are described in the background of the present disclosure.

DISCLOSURE OF INVENTION

Technical Problem

In view of this, an objective of embodiments of the present disclosure is to provide a method and device for transmitting and detecting signals, to solve the collision problem of multiple signals.

Another objective of embodiments of the present disclosure is to provide a method for transmitting the DRS signal in the DL transmission burst, a method and device for detecting the DRS signal in the DL transmission burst, to solve the problem that the UE in the serving cell or neighbor cell misdetects the reference signal.

Solution to Problem

An embodiment of the present disclosure provides a method for transmitting signals, including:

determining, by a communication node, that resources of a Discovery Reference Signal (DRS) and resources of other types of reference signals are overlapped; and selecting, by the communication node, at least one type of signal from the DRS and the other types of reference signals according to a predefined mode, and transmitting the selected signal.

Preferably, the DRS at least includes: a first type of Primary Synchronization Signal (PSS)/Secondary Synchronization Signal (SSS) and a Cell-specific Reference Signal (CRS). The first type of PSS/SSS may be the PSS/SSS being part of a DRS and may only be transmitted in the DMTC window.

Preferably, the DRS further includes: a first type of Non-Zero Power (NZP) Channel State Information-Reference Signal (CSI-RS) and/or a second type of NZP CSI-RS.

Preferably, the second type of PSS/SSS may include the PSS/SSS, which may be transmitted in a subframe 0/5 outside of the DMTC window and the PSS/SSS, which may be transmitted in the subframe 0/5 in the DMTC window, but is not part of DRS.

Preferably, when resources of the first type of PSS/SSS and resources of a third type of NZP CSI-RS/a third type of Zero Power (ZP) CSI-RS are overlapped, the predefined mode includes at least one of:

mode one: the communication node does not transmit the third type of NZP CSI-RS and/or the third type of ZP CSI-RS is not able to be used to measure interference;

mode two: in a Physical Resource Block (PRB), at which the first type of PSS/SSS is located, the communication node does not transmit the third type of NZP CSI-RS, resources of which are overlapped with those of the first type of PSS/SSS, and/or a third type of ZP CSI-RS is not able to be used to measure the interference, in other PRBs, the communication node transmits the third type of NZP CSI-RS and/or the third type of ZP CSI-RS is able to be used to measure the interference.

Preferably, when resources of the first type of NZP CSI-RS and resources of a third type of NZP CSI-RS/a third type of ZP CSI-RS are overlapped, the predefined mode includes at least one of:

mode one: a signal with a lower priority is dropped according to priorities of signals, resources of which are overlapped;

mode two: when the first type of NZP CSI-RS is a subnet or a universal set of the third type of NZP CSI-RS, and the first type of NZP CSI-RS and the third type of NZP CSI-RS are sent from a same transmission point, the first type of NZP CSI-RS is transmitted according to power of a first type of NZP CSI-RS configuration, an antenna port of the third type of NZP CSI-RS, resources of which are overlapped with those of an antenna port of the first type of NZP CSI-RS, is not transmitted, and the third type of NZP CSI-RS corresponding to another antenna port, resources of which are not overlapped with those of any antenna port of the first type of NZP CSI-RS, is transmitted according to the power configured for the first type of NZP CSI-RS;

mode three: when the first type of NZP CSI-RS is the subnet or the universal set of the third type of NZP CSI-RS, and the first type of NZP CSI-RS and the third type of NZP CSI-RS are sent from the same transmission point, the first type of NZP CSI-RS is transmitted according to the power of the first type of NZP CSI-RS configuration, the antenna port of the third type of NZP CSI-RS, the resources of which are overlapped with those of the antenna port of the first type of NZP CSI-RS, is not transmitted, and an antenna port of the third type of NZP CSI-RS, time-frequency resources occupied by which are not the same as those occupied by any antenna port of the first type of NZP CSI-RS is transmitted according to power of a third type of NZP CSI-RS configuration and an antenna port of the third type of NZP CSI-RS, time-frequency resources occupied by which are same as those occupied by an antenna port of the first type of NZP CSI-RS is transmitted according to the power configured for the first type of NZP CSI-RS;

mode four: when the first type of NZP CSI-RS is the subnet or the universal set of the third type of NZP CSI-RS, and the first type of NZP CSI-RS and the third type of NZP CSI-RS are sent from the same transmission point, the first type of NZP CSI-RS is transmitted according to the power of the third type of NZP CSI-RS configuration, the antenna port of the third type of NZP CSI-RS, the resources of which are overlapped with those of the antenna port of the first type of NZP CSI-RS, is not transmitted, and the antenna port of the third type of NZP CSI-RS, time-frequency resources occupied by which are not the same as those occupied by any antenna port of the first type of NZP CSI-RS is transmitted according to the power of the third type of NZP CSI-RS configuration.

Preferably, when resources of the second type of NZP CSI-RS and resources of a third type of NZP CSI-RS/a third type of ZP CSI-RS are overlapped, the predefined mode includes at least one of:

mode one: a signal with a lower priority is dropped according to priorities of signals, resources of which are overlapped;

mode two: when the second type of NZP CSI-RS is a subnet or a universal set of the third type of NZP CSI-RS, the second type of NZP CSI-RS and the third type of NZP CSI-RS are sent from the same transmission point, resources of the second type of NZP CSI-RS and resources of the third type of NZP CSI-RS are totally same, and the second type of NZP CSI-RS and the third type of NZP CSI-RS correspond to a same CSI process, the second type of NZP CSI-RS and the third type of NZP CSI-RS do not collide with each other;

mode three: when the second type of NZP CSI-RS is the subnet or the universal set of the third type of NZP CSI-RS, the second type of NZP CSI-RS and the third type of NZP CSI-RS are sent from the same transmission point, and the second type of NZP CSI-RS and the third type of NZP CSI-RS correspond to different CSI processes, the second type of NZP CSI-RS is transmitted according to power of a second type of NZP CSI-RS configuration, an antenna port of the third type of NZP CSI-RS, which collides with an antenna port of the second type of NZP CSI-RS, is not transmitted, and the third type of NZP CSI-RS corresponding another antenna port, which does not collide with any antenna port of the second type of NZP CSI-RS, is transmitted according to the power configured for the second type of NZP CSI-RS.

Preferably, when resources of the first type of NZP CSI-RS and resources of a Demodulation Reference Signal (DM-RS) are overlapped, the predefined mode includes at least one of:

mode one: the communication node does not transmit the DM-RS on overlapped resource elements, and/or the DM-RS on the overlapped resource elements is not used to perform channel estimation;

mode two: the communication node does not transmit the DM-RS in Orthogonal Frequency Division Multiplexing (OFDM) symbols including the overlapped resource elements, and/or the DM-RS in the OFDM symbols including the overlapped resource elements is not used to perform the channel estimation;

mode three: the communication node does not transmit the DM-RS on the overlapped resource elements and does not transmit a DM-RS, which has a same port as that of the DM-RS corresponding to the overlapped resource elements, in the OFDM symbols including the overlapped resource elements, and/or the DM-RS, which has a same port as that of the DM-RS corresponding to the overlapped resource elements and is in the OFDM symbols including the overlapped resource elements, is not used to perform the channel estimation; and mode four: the communication node does not transmit the DM-RS in a sub-frame including the overlapped resource elements, and/or the DM-RS in the subframe including the overlapped resource elements is not used to perform the channel estimation.

Another embodiment of the present disclosure provides a device for transmitting signals, including: a collision determination module and a signal transmission module; wherein the collision determination module, is to determine whether resources of a Discovery Reference Signal (DRS) and resources of other types of reference signals are overlapped; and the signal transmission module, is to select at least one type of signal from the DRS and the other types of reference signals according to a predefined mode and transmit the selected signal when the resources of the DRS and the resources of the other types of reference signals are overlapped.

Another embodiment of the present disclosure provides a method for receiving signaling, including:

determining, by a terminal device, that resources of a Discovery Reference Signal (DRS) and resources of other types of reference signals are overlapped; and receiving, by the terminal device, a signal according to a predefined mode.

Preferably, the DRS at least includes: a first type of Primary Synchronization Signal (PSS)/a Secondary Synchronization Signal (SSS) and a Cell-specific Reference Signal (CRS).

Preferably, the DRS further includes: a first type of Non-Zero Power (NZP) Channel State Information-Reference Signal (CSI-RS) and/or a second type of NZP CSI-RS.

Preferably, when resources of the first type of PSS/SSS and resources of a third type of NZP CSI-RS/a third type of Zero Power (ZP) CSI-RS are overlapped, the predefined mode includes at least one of:

mode one: the terminal device assumes that in subframes with resource overlap, a communication node does not transmit the third type of NZP CSI-RS and/or the third type of ZP CSI-RS is not able to be used to measure interference;

mode two: the terminal device assumes that in a Physical Resource Block (PRB), at which the first type of PSS/SSS is located, in the subframes with resource overlap, the communication node does not transmit the third type of NZP CSI-RS, resources of which are overlapped with those of the first type of PSS/SSS, and/or the third type of ZP CSI-RS is not able to be used to measure the interference, in other PRBs, the communication node transmits the third type of NZP CSI-RS and/or the third type of ZP CSI-RS is able to be used to measure the interference.

Preferably, when resources of the first type of NZP CSI-RS and resources of a third type of NZP CSI-RS/a third type of ZP CSI-RS are overlapped, the predefined mode includes at least one of:

mode one: a signal with a higher priority is received according to priorities of signals, resources of which are overlapped;

mode two: when the first type of NZP CSI-RS is a subnet or a universal set of the third type of NZP CSI-RS, and the first type of NZP CSI-RS and the third type of NZP CSI-RS are sent from a same transmission point, the UE assumes that the third type of NZP CSI-RS, resources of which are overlapped with those of the first type of NZP CSI-RS, is not able to be used to measure the interference, or the UE assumes that the third type of NZP CSI-RS, resources of which are overlapped with those of the first type of NZP CSI-RS, is able to be used to measure the interference and influence of the first type of NZP CSI-RS is removed when interference computation is performed.

Preferably, when resources of the second type of NZP CSI-RS and resources of a third type of NZP CSI-RS/a third type of ZP CSI-RS are overlapped, the predefined mode includes at least one of:

mode one: a signal with a higher priority is received according to priorities of signals, resources of which are overlapped;

mode two: when the second type of NZP CSI-RS is a subnet or a universal set of the third type of NZP CSI-RS, and the second type of NZP CSI-RS and the third type of NZP CSI-RS are sent from a same transmission point, the UE assumes that the third type of ZP CSI-RS, resources of which are overlapped with those of the second type of NZP CSI-RS, is not able to be used to measure the interference, or the UE assumes that the third type of ZP CSI-RS, resources of which are overlapped with those of the second type of NZP CSI-RS, is able to be used to measure the interference and influence of the second type of NZP CSI-RS is removed when interference computation is performed.

preferably, when resources of the first type of NZP CSI-RS and resources of a Demodulation Reference Signal (DM-RS) are overlapped, the predefined mode includes at least one of:

mode one: the terminal device assumes that in a subframe including overlapped resource elements, the communication node does not transmit the DM-RS on the overlapped resource elements, and/or the DM-RS on the overlapped resource elements is not used to perform channel estimation;

mode two: the terminal device assumes that in the subframe including the overlapped resource elements, the communication node does not transmit the DM-RS in Orthogonal Frequency Division Multiplexing (OFDM) symbols including the overlapped resource elements, and/or the DM-RS in the OFDM symbols including the overlapped resource elements is not used to perform the channel estimation;

mode three: the terminal device assumes that in the subframe including the overlapped resource elements, the communication node does not transmit the DM-RS on the overlapped resource elements and does not transmit a DM-RS, which has a same port as that of the DM-RS corresponding to the overlapped resource elements, in the OFDM symbols including the overlapped resource elements, and/or the DM-RS, which has a same port as that of the DM-RS corresponding to the overlapped resource elements and is in the OFDM symbols including the overlapped resource elements, is not used to perform the channel estimation; and mode four: the terminal device assumes that in the subframe including the overlapped resource elements, the communication node does not transmit the DM-RS in the sub-frame including the overlapped resource elements, and/or the DM-RS in the subframe including the overlapped resource elements is not used to perform the channel estimation.

Another embodiment of the present disclosure provides a device for receiving signals, including: a collision determination module and a signal receiving module; wherein the collision determination module is to determine whether resources of a Discovery Reference Signal (DRS) and resources of other types of reference signals are overlapped; and the signal receiving module is to receive a signal according to a predefined mode when the resources of the DRS and the resources of the other types of reference signals are overlapped.

Another embodiment of the present disclosure provides a method for configuring a reference signal, including:

determining to configure at least one set of a second type of Non-Zero Power (NZP) Channel State Information-Reference Signal (CSI-RS); and making a configuration, in which the at least one set of the second type of NZP CSI-RS and at least one set of a third type of NZP CSI-RS belong to a same CSI process.

Preferably, the method further includes: determining transmission power of the reference signal according to following modes:

transmitting the second type of NZP CSI-RS and the third type of NZP CSI-RS using same transmission power when the second type of NZP CSI-RS and the third type of NZP CSI-RS belonging to the same CSI process are in a same Downlink (DL) transmission burst;

transmitting the second type of NZP CSI-RS and the third type of NZP CSI-RS using the same transmission power or different transmission power when the second type of NZP CSI-RS and the third type of NZP CSI-RS belonging to the same CSI process are not in the same DL transmission burst.

Preferably, the method further includes:

respectively configuring Pcs for the second type of NZP CSI-RS and the third type of NZP CSI-RS; or configuring one set of Pc for the second type of NZP CSI-RS and the third type of NZP CSI-RS; or not configuring the Pc for the second type of NZP CSI-RS and the third type of NZP CSI-RS; wherein Pc is transmission power of an assumed reference Physical Downlink Shared Channel (PDSCH) when a UE feeds back CSI.

Preferably, the method further includes in MeasDS-Config of a Discovery Reference Signal (DRS), only configuring a process Identity (ID) of the second type of NZP CSI-RS, not explicitly configuring resources of the second type of NZP CSI-RS; or in the MeasDS-Config, explicitly configuring the resources of the second type of NZP CSI-RS.

An embodiment of the present disclosure provides a device for configuring a reference signal, including: a determination module and a configuration module; wherein the determination module is to determine to configure at least one set of a second type of Non-Zero Power (NZP) Channel State Information-Reference Signal (CSI-RS); and the configuration module is to make a configuration, in which the at least one set of the second type of NZP CSI-RS and at least one set of a third type of NZP CSI-RS belong to a same CSI process.

An embodiment of the present disclosure provides a method for transmitting a Discovery Reference Signal (DRS) in a Downlink (DL) transmission burst including data, including: transmitting one type of signal in a partial subframe according to at least one of following modes:

mode one: the DRS is not transmitted in the partial subframe;

mode two: when length of the partial subframe is not enough to transmit the DRS, the DRS is not transmitted in the partial subframe, and when the length of the partial subframe is enough to transmit the DRS, the DRS is transmitted in the partial sbuframe;

mode three: the DRS is not transmitted in the partial subframe except for a subframe 0/5, when the subframe 0/5 is the partial subframe, the DRS is not transmitted in the subframe 0/5 when the length of the subframe 0/5 is not enough to transmit the DRS, and the DRS is transmitted in the partial subframe when the length of the subframe 0/5 is enough to transmit the DRS, the second type of PSS/SSS is not transmitted in the subframe 0/5, or when the length of the partial subframe 0/5 is enough to transmit the second type of PSS/SSS, the second type of PSS/SSS is transmitted; when the length of the partial subframe 0/5 is not enough to transmit the second type of PSS/SSS, the second type of PSS/SSS is not transmitted and other signals are transmitted according to Downlink Pilot Time Slot (DwPTS);

mode four: the DRS is not transmitted in the partial subframe except for the subframe 0/5; when the subframe 0/5 is the partial subframe and the subframe 0/5 is in a Discovery Reference Signal Measurement Timing Configuration (DMTC window) window, the second type of PSS/SSS is not transmitted in the subframe 0/5, the DRS is not transmitted in the subframe 0/5 when the length of the subframe 0/5 is not enough to transmit the DRS, and the DRS is transmitted in the partial subframe when the length of the subframe 0/5 is enough to transmit the DRS; when the subframe 0/5 is the partial subframe and the subframe 0/5 is out of the DMTC window, the second type of PSS/SSS is not transmitted in the subframe 0/5 and a signal is transmitted according to Downlink Pilot Time Slot (DwPTS) subframe structure; and mode five: when the subframe 0/5 is the partial subframe, the second type of PSS/SSS is not transmitted in the subframe 0/5 and other signals of the subframe 0/5 are transmitted according to DwPTS subframe structure.

Preferably, as for any of the mode one to mode four, when the DRS is not transmitted in the partial subframe, the method further includes: transmitting the signal according to the DwPTS subframe structure in the partial subframe.

Preferably, as for any of the mode two to mode four, when the DRS is transmitted in the partial subframe, the method further includes: transmitting other signals except for the DRS according to a normal DL subframe, or the DwPTS subframe structure.

Preferably, as for any of the mode two to mode four, when the DRS is transmitted in the partial subframe and other signals except for the DRS are transmitted according to Downlink Pilot Time Slot (DwPTS), when resources of a first type of NZP CSI-RS and resources of a DM-RS are overlapped, the DM-RS is not transmitted on the overlapped resource elements, or the DM-RS is not transmitted in symbols comprising the overlapped resource elements, or the DM-RS, which has a same port as that of the DM-RS corresponding to the overlapped resource elements, is not transmitted in the symbols comprising the overlapped resource elements, or the DM-RS is not transmitted in the partial subframe.

An embodiment of the present disclosure provides a method for receiving a Discovery Reference Signal (DRS) in a Downlink (DL) transmission burst including data, including: receiving at least one type of signal in a partial subframe according to at least one of following modes:

mode one: it is assumed that there is no DRS in the partial subframe;

mode two: when length of the partial subframe is not enough to transmit the DRS, it is assumed that there is no DRS in the partial subframe, and when length of the partial subframe is enough to transmit the DRS, it is assumed that the DRS is detected from the partial sbuframe;

mode three: it is assumed that there is no DRS in the partial subframe except for a subframe 0/5; when the subframe 0/5 is the partial subframe, it is assumed that there is no second type of PSS/SSS in the subframe 0/5, it is assumed that there is no DRS in the subframe 0/5 when the length of the subframe 0/5 is not enough to transmit the DRS, and the DRS is detected from the partial subframe when the length of the subframe 0/5 is enough to transmit the DRS;

mode four: it is assumed that there is no DRS in the partial subframe except for the subframe 0/5; when the subframe 0/5 is the partial subframe and the subframe 0/5 is in a Discovery Reference Signal Measurement Timing Configuration (DMTC window) window, it is assumed that there is no second type of PSS/SSS in the subframe 0/5 and there is no DRS in the subframe 0/5 when the length of the subframe 0/5 is not enough to transmit the DRS, and the DRS is detected from the partial subframe when the length of the subframe 0/5 is enough to transmit the DRS; when the subframe 0/5 is the partial subframe and the subframe 0/5 is out of the DMTC window, it is assumed that there is no second type of PSS/SSS in the subframe 0/5 and a signal is received according to Downlink Pilot Time Slot (DwPTS) subframe structure; and mode five: when the subframe 0/5 is the partial subframe, it is assumed that there is no the second type of PSS/SSS in the subframe 0/5 and other signals of the subframe 0/5 are received according to the DwPTS subframe structure.

Preferably, as for any of the mode one to mode four, when assuming that there is no DRS in the partial subframe, the method further includes: receiving the signal according to the DwPTS subframe structure in the partial subframe.

Preferably, as for any of the mode two to mode four, when detecting the DRS in the partial subframe, the method further includes: receiving other signals except for the DRS according to a normal DL subframe, or the DwPTS subframe structure.

Preferably, as for any of the mode two to mode four, when the DRS is received in the partial subframe and other signals except for the DRS are received according to Downlink Pilot Time Slot (DwPTS), when resources of a first type of NZP CSI-RS and resources of a DM-RS are overlapped, the DM-RS is not received on the overlapped resource elements, or the DM-RS is not received in symbols comprising the overlapped resource elements, or the DM-RS, which has a same port as that of the DM-RS corresponding to the overlapped resource elements, is not received in the symbols comprising the overlapped resource elements, or the DM-RS is not received in the partial subframe.

An embodiment of the present disclosure provides a method for transmitting a Discovery Reference Signal (DRS), including: determining a subframe for transmitting the DRS according to at least one of following modes:

mode one: the DRS is transmitted in a subframe, which is not after a subframe 0/5 in a DMTC window when the subframe 0/5 belongs to a Downlink (DL) transmission burst, the length of the subframe 0/5 is enough to transmit a complete DRS and the subframe 0/5 is in the DMTC window;

mode two: the DRS is only transmitted in the subframe 0/5 when the subframe 0/5 belongs to the DL transmission burst, the length of the subframe 0/5 is enough to transmit a complete DRS and the subframe 0/5 is in the DMTC window;

mode three: when a communication node starts to transmit the DL transmission burst prior to the DMTC window and the DL transmission burst lasts into the DMTC window, the DRS is transmitted in a first subframe without extra Listen Before Talk (LBT) when length of the first subframe in the DMTC window is enough to transmit the DRS, the LBT is performed in the DMTC window and the DRS is tried to be transmitted when the length of the first subframe in the DMTC window is not enough to transmit the DRS.

An embodiment of the present disclosure provides a method for receiving a Discovery Reference Signal (DRS), including: determining the subframe for receiving the transmitted DRS according to at least one of following modes:

mode one: the DRS is detected in a subframe, which is not after a subframe 0/5 in a DMTC window when a subframe 0/5 belongs to a Downlink (DL) transmission burst, the length of subframe 0/5 is enough to transmit a complete DRS and the subframe 0/5 is in the DMTC window;

mode two: the DRS is only detected in the subframe 0/5 when the subframe 0/5 belongs to the DL transmission burst, the length of subframe 0/5 is enough to transmit a complete DRS and the subframe 0/5 is in the DMTC window;

mode three: when a communication node starts to transmit the DL transmission burst prior to the DMTC window and the DL transmission burst lasts into the DMTC window, the DRS is detected in a first subframe when length of the first subframe in the DMTC window is enough to transmit the DRS.

An embodiment of the present disclosure provides a method for measuring interference, including:

in a subframe configured with interference measurement resources, determining, by a terminal device, a type of the subframe when the terminal device detects that a base station transmits a signal; and measuring, by the terminal device, the interference in the subframe when the subframe is a subframe, which is able to measure the interference.

Preferably, the method for determining the type of the subframe includes: determining whether the subframe is a subframe in a Downlink (DL) transmission burst including data, and a determining method includes at least one of following modes:

mode one: determining that the subframe is a subframe in the DL transmission burst including the data when the terminal device receives DL scheduling information used to schedule the terminal device in the subframe or the terminal device receives signaling indicating the DL transmission burst including the data in the subframe;

mode two: determining that the subframe is a subframe in the DL transmission burst including the data when the terminal device determines that the base station transmits a DL signal in a part including interference measurement resources in the subframe and determines that a previous subframe of the subframe and/or a next subframe of the subframe belong to a same DL transmission burst including the data;

mode three: when terminal device detects the signaling indicating the DL transmission burst including the data in the subframe prior to the subframe and the signaling indicates the length of the DL transmission burst, determining that the subframe is a subframe in the DL transmission burst including the data when the subframe is a subframe in the DL transmission burst including the data.

An embodiment of the present disclosure provides a device for measuring interference, including: a subframe type determination module and an interference measurement module; wherein the subframe type determination module is to determine, in a subframe configured with interference measurement resources, a type of the subframe when detecting that a base station transmits a signal; and the interference measurement module is to measure the interference in the subframe when the subframe is a subframe, which is able to measure the interference.

Advantageous Effects of Invention

In view of the above technical solution, in the technical solution provided by embodiments of the present disclosure, when the resources of the DRS and resources of other types of reference signals are overlapped, the communication node selects at least one type of signal from the DRS and the other types of reference signals according to a predefined mode, to solve the collision problem of multiple types of signal.

BRIEF DESCRIPTION OF DRAWINGS

FIG. 1 is a diagram illustrating that a DRS collides with a third type of Non-Zero Power (NZP) CSI-RS or a third type of Zero Power (ZP) CSI-RS in accordance with a first embodiment of the present disclosure;

FIG. 2 is a diagram illustrating that the third type of NZP CSI-RS/the third type of ZP CSI-RS collides with the first type of PSS/SSS in accordance with the first embodiment of the present disclosure;

FIG. 3 is a diagram illustrating that the third type of NZP CSI-RS/the third type of ZP CSI-RS collides with the first type of NZP CSI-RS in the first embodiment of the present disclosure;

FIG. 4 is a diagram illustrating the third type of NZP CSI-RS/the third type of ZP CSI-RS collides with the second type of NZP CSI-RS in the first embodiment of the present disclosure;

FIG. 5 is a diagram illustrating that the second type of NZP CSI-RS and the third type of NZP CSI-RS belonging to a same CSI process are in a same DL transmission burst in accordance with a second embodiment of the present disclosure;

FIG. 6 is a diagram illustrating that the DRS is not transmitted in the partial subframe in accordance with a third embodiment of the present disclosure;

FIG. 7a is a diagram illustrating a Downlink Pilot Time Slot (DwPTS) configuration 4 in accordance with various embodiments of the present disclosure;

FIG. 7b is a diagram illustrating a normal subframe in accordance with various embodiments of the present disclosure;

FIG. 8 is a diagram illustrating transmitting the DRS in the partial subframe and transmitting other signals except for the DRS according to normal DL subframe in accordance with the third embodiment of the present disclosure;

FIG. 9 is a diagram illustrating that a subframe 0/5 is the partial subframe and in a DMTC window in accordance with the third embodiment of the present disclosure;

FIG. 10 is a pattern showing the partial subframe 0/5 adopting the DwPTS subframe structure and the subframe 0/5 adopting normal subframe structure in accordance with the third embodiment of the present disclosure;

FIG. 11a is a diagram illustrating a situation that the UE cannot correctly detect the DRS in accordance with various embodiments of the present disclosure;

FIG. 11b is a diagram illustrating transmitting the DRS in a DMTC window in accordance with a fourth embodiment of the present disclosure;

FIG. 12 is a diagram illustrating that a base station transmits a DRS in a subframe, which is not after the subframe 0/5 in a DMTC window in accordance with the fourth embodiment of the present disclosure;

FIG. 13 is a diagram illustrating a first example in accordance with a sixth embodiment of the present disclosure;

FIG. 14 is a diagram illustrating a second example in accordance with the sixth embodiment of the present disclosure;

FIG. 15 is a diagram illustrating a third example in accordance with the sixth embodiment of the present disclosure;

FIG. 16 is a diagram illustrating structure of a preferred device for transmitting signals in accordance with various embodiments of the present disclosure;

FIG. 17 is a diagram illustrating structure of a preferred device for receiving signals in accordance with various embodiments of the present disclosure;

FIG. 18 is a diagram illustrating structure of a preferred device for configuring reference signals in accordance with various embodiments of the present disclosure; and FIG. 19 is a diagram illustrating a preferred device for measuring interference in accordance with various embodiments of the present disclosure;

FIG. 20 is a diagram illustrating that the subframe 0/5 in the embodiment three is the partial subframe and resources of the first type of NZP CSI-RS and resources of the DM-RS are overlapped;

FIG. 21 is a diagram illustrating that the subframe 0/5 in the embodiment three is the partial subframe and resources of the first type of NZP CSI-RS and resources of the DM-RS are overlapped; and FIG. 22 is a diagram illustrating that the subframe 0/5 in the embodiment three is the partial subframe and resources of the first type of NZP CSI-RS and resources of the DM-RS are overlapped.

MODE FOR THE INVENTION

To make the objective and technical solution of the examples of the present disclosure more apparent, the present disclosure may be described in detail with reference to accompanying figures.

First, the types of the reference signals mentioned in embodiments of the present disclosure may be described in brief.

The first type of Non-Zero Power (NZP) Channel State Information-Reference Signal (CSI-RS) may be the NZP CSI-RS used to perform Radio resource management (RRM) measurement in DRSs and may only appear in a DRS subframe.

The second type of NZP CSI-RS may be the NZP CSI-RS used to perform CSI measurement in the DRSs and may only appear in the DRS subframe.

The third type of NZP CSI-RS may be a periodic NZP CSI-RS used to perform the CSI measurement and may only appear in a configured subframe. The periodic NZP CSI-RS is based on the LBT. Preferably, the periodic NZP CSI-RS may adopt an LBT mode, such as LBT Cat 4, which may be the same as that of Downlink (DL) data.

The third type of Zero Power (ZP) CSI-RS may be periodic CSI-Interference Measurement (IM) resources used to perform the CSI measurement and may appear in a configured subframe.

The first type of PSS/SSS may be the PSS/SSS being part of a DRS and may only be transmitted in the DMTC window.

The second type of PSS/SSS may include the PSS/SSS, which may be transmitted in a subframe 0/5 outside of the DMTC window and the PSS/SSS, which may be transmitted in the subframe 0/5 in the DMTC window, but is not part of DRS.

The DL transmission burst, which is only used to transmit the DRS: In the DMTC window or prior to the initial position of a DMTC window, a base station may occupy a channel adopting a rapid LBT mode. When the LBT is successful, the DL transmission burst, which may be only used to transmit the DRS, may be transmitted. This type of DL transmission burst may only be used to transmit the DRS, but shall not be used to transmit data (including Physical Downlink Shared Channel (PDSCH) and/or Physical Downlink Control Channel (PDCCH)/Enhanced Physical Downlink Control Channel (EPDCCH)). Further, the duration of the DL transmission burst shall not exceed a preset time, such as 1 ms.

The DL transmission burst including data: At any time, the base station may occupy a channel via a normal LBT mode, such as LBT Cat 4. When the LBT is successful, the data may be transmitted. The duration of the DL transmission burst including the data may be determined according to the maximum channel occupancy time, such as not exceed 4 ms. When the DL transmission burst falls into the DMTC window, the DL transmission burst may also include the DRS. For instance, the DRS and data may multiplex a subframe in the DL transmission burst, or the DRS may occupy a whole subframe in the DL transmission burst.

In embodiments of the present disclosure, suppose that all of the above types of reference signals are based on the LBT. However, embodiments of the present disclosure may also be applied to a situation that the reference signals are not be based on the LBT.

The first type of NZP CSI-RS, the second type of NZP CSI-RS and the first type of PSS/SSS may adopt a same LBT mode and may be in a same DRS occasion, such as a same 1 ms DRS. The third type of NZP CSI-RS, the third type of ZP CSI-RS and the second type of PSS/SSS may adopt the same LBT mode and may adopt the LBT mode, which may be same as that adopted by the DL transmission burst for transmitting the data (such as the PDSCH) and the control channel (such as the PDCCH/EPDCCH). All of the above types of reference signals and the data (including the Physical Downlink Shared Channel (PDSCH), and/or PDCCH/EPDCCH) may be transmitted in a same DL transmission burst and may also be separately transmitted.

The solution of the present disclosure may be described hereinafter in detail through several preferred embodiments.

Embodiment One

An embodiment of the present disclosure may describe that when resources of the DRS and resources of other types of reference signals are overlapped, a communication node may select at least one type of signal from the DRS and the reference signals according to a predefined mode and transmit the selected signal. In embodiments of the present disclosure, a situation that all or part of resources of the two types of signals are overlapped may be called that the two types of signals may collide with each other. The way of description of "collision" may be used hereinafter.

when the DRS, the third type of NZP CSI-RS/the third type of ZP CSI-RS are in a same subframe, and the DRS collides with the third type of NZP CSI-RS/the third type of ZP CSI-RS, i.e., all or part of resources of the DRS and the third type of NZP CSI-RS/the third type of ZP CSI-RS are overlapped, such as in the subframe 4 in the first DMTC window as shown in FIG. 1. In embodiments of the present disclosure, symbol "/" may denote "or". One type of signal may be selected according to the following modes and transmitted, or both the two types of signals may be transmitted.

Situation one: When the third type of NZP CSI-RS/the third type of ZP CSI-RS and the first type of PSS/SSS collide each other, as shown in FIG. 2, the processing may be performed according to the following two modes.

Mode one: The UE may assume that in a subframe, in which the collision occurs, the base station does not transmit the third type of NZP CSI-RS collided with the first type of PSS/SSS, and/or the UE may assume that the third type of ZP CSI-RS is not be able to measure the interference.

Mode two: The UE may assume that in a Physical Resource Block (PRB) of the first type of PSS/SSS in a subframe, in which the collision occurs, the base station does not transmit the third type of NZP CSI-RS collided with the first type of PSS/SSS, and/or the UE may assume that the third type of ZP CSI-RS is not able to be used to measure the interference. However, in other PRBs, the UE may assume that the base station transmits the third type of NZP CSI-RS, and/or the UE may assume that the third type of ZP CSI-RS is able to measure the interference.

The UE may determine whether the first type of PSS/SSS exists via detecting the DRS or detecting a control channel indicating the transmission of the DRS in a subframe in the DMTC window or in a subframe, which is in or outside of the DMTC window.

The UE may perform a corresponding PDSCH rate matching according to the assumption in the mode one or mode two.

Situation two: When the third type of NZP CSI-RS/the third type of ZP CSI-RS collides with the first type of NZP CSI-RS, as shown in FIG. 3, following two modes may be adopted.

Mode one: A reference signal with lower priority may be dropped according to priorities of signals colliding with each other. Preferably, the third type of NZP CSI-RS/the third type of ZP CSI-RS may be dropped and the first type of NZP CSI-RS may be transmitted.

Mode two: When the first type of NZP CSI-RS is a subset or universal set (time-frequency code three-dimension) of the third type of NZP CSI-RS and both the first type of NZP CSI-RS and the third type of NZP CSI-RS are sent from a same transmission node, such as a same Transmission Point (TP), the first type of NZP CSI-RS and the third type of NZP CSI-RS may be transmitted according to mode (a), mode (b) or mode (c).

In mode (a), the first type of NZP CSI-RS may be transmitted and transmission power of the first type of NZP CSI-RS may be set according to power of a first type of NZP CSI-RS configuration. For instance, the power of the first type of NZP CSI-RS may be kept unchanged in all DMTC windows. An antenna port of the third type of NZP CSI-RS, which may collide with the antenna port of the first type of NZP CSI-RS, shall not be transmitted and the third type of NZP CSI-RS corresponding to other un-collided ports may be transmitted. Further, power of all ports of the third type of NZP CSI-RS may be the same as power of the port of the first type of NZP CSI-RS.

For instance, as shown in FIG. 3, resources of the first type of NZP CSI-RS are two Resource Elements (RE)s and the first type of NZP CSI-RS corresponds to only one antenna port, i.e., port 15. Resources of the third type of NZP CSI-RS are eight REs and the third type of NZP CSI-RS corresponds to eight antenna ports, i.e., port 15 to port 22. The port 17/18 of the third type of NZP CSI-RS and the port 15 of the first type of NZP CSI-RS occupy same time frequency resources. In general, suppose that an orthogonal code word corresponding to the port 15 of the first type of NZP CSI-RS is [1 1], the orthogonal code word corresponding to the port 17 of the third type of NZP CSI-RS is [1 1], and the orthogonal code word of the port 18 of the third type of NZP CSI-RS is [1 −1]. In this case, the time-frequency resources of the port 18 of the third type of NZP CSI-RS collide with those of the port 15 of the first type of NZP CSI-RS, while a code word resource of the port 18 of the third type of NZP CSI-RS does not collide with that of the port 15 of the first type of NZP CSI-RS. Therefore, the base station transmits the port 15 of the first type of NZP CSI-RS and the ports 15, 16, 18 to 22 of the third type of NZP CSI-RS. The power of the port 15 of the first type of NZP CSI-RS is the same as the power of the ports 15, 16, 18 to 22 of the third type of NZP CSI-RS. The ports 15, 16, 18 to 22 of the third type of NZP CSI-RS are transmitted according to the power of the first type of NZP CSI-RS.

The UE measures and computes the CSI of eight ports using the port 15 of the first type of NZP CSI-RS and the ports 15, 16, 18 to 22 of the third type of NZP CSI-RS.

In mode (b), the first type of NZP CSI-RS may be transmitted and transmission power of the first type of NZP CSI-RS may be set according to the power of the first type of NZP CSI-RS configuration. An antenna port of the third type of NZP CSI-RS, which may collide with the antenna port of the first type of NZP CSI-RS, shall not be transmitted and the third type of NZP CSI-RS corresponding to other un-collided ports may be transmitted. Further, an antenna ports of the third type of NZP CSI-RS, time-frequency resources occupied by which are different from those occupied by the first type of NZP CSI-RS, may be transmitted according to the power of the third type of NZP CSI-RS configuration. However, an antenna port of the third type of NZP CSI-RS, which occupies the same time-frequency resources as those occupied by the antenna port of first type of NZP CSI-RS, may be transmitted according to the power of the first type of NZP CSI-RS.

For instance, as shown in FIG. 3, the base station transmits the port 15 of the first type of NZP CSI-RS and transmits the port 18 of the third type of NZP CSI-RS. Both the port 15 of the first type of NZP CSI-RS and the port 18 of the third type of NZP CSI-RS are transmitted according to the power of the first type of NZP CSI-RS. The ports 15, 16, 19 to 22 of the third type of NZP CSI-RS are transmitted according to the power of the third type of NZP CSI-RS.

When there is signaling indicating power difference between the third type of NZP CSI-RS and the first type of NZP CSI-RS, the UE measures and computes the CSI of the eight ports using the port 15 of the first type of NZP CSI-RS and the ports 15, 16, 18 to 22 of the third type of NZP CSI-RS.

As for the above mode (a) and mode (b), the UE may assume that the third type of ZP CSI-RS colliding with the first type of NZP CSI-RS cannot be used to measure the interference. Alternatively, the UE may assume that the third type of ZP CSI-RS colliding with the first type of NZP CSI-RS may be used to measure the interference. When the interference computation is performed, the influence of the first type of NZP CSI-RS should be removed.

In order to enable the UE determine whether the first type of NZP CSI-RS and the third type of ZP CSI-RS belong to a same transmission point, the base station may use signaling, such as Qualsi-colocated to indicate whether the first type of NZP CSI-RS and the third type of ZP CSI-RS belong to the same transmission point.

In mode (c), the first type of NZP CSI-RS may be transmitted and the transmission power of the first type of NZP CSI-RS may be set according to the power of the third type of NZP CSI-RS configuration. Antenna ports of the third type of NZP CSI-RS, which may collide with the antenna ports of the first type of NZP CSI-RS, shall not be transmitted and the third type of NZP CSI-RS corresponding to other antenna ports, which do not collide with any antenna port of the first type of NZP CSI-RS may be transmitted. Further, antenna ports of the third type of NZP CSI-RS, time-frequency resources occupied which are not the same as those occupied by the first type of NZP CSI-RS, may be transmitted according to the power of the third type of NZP CSI-RS configuration. This case may equal to that all antenna ports of the third type of NZP CSI-RS are transmitted and the power may be set according to the third type of NZP CSI-RS.

Although the above mode (a), mode (b) and mode (c) describe that as for the antenna port of the third type of NZP CSI-RS and the antenna port of the first type of NZP CSI-Rs, which collide with each other, only the first type of NZP CSI-RS is transmitted. However, since at the location that the collision occurs, the resources and sequence of the two types of NZP CSI-RS signals are totally the same. The transmission of the first type of NZP CSI-RS may equal to that the third type of NZP CSI-RS may be transmitted. Therefore, the mode (a), mode (b) and mode (c) may be interpreted as that the base station shall not only transmit the first type of NZP CSI-RS, but also transmit the third type of the NZP CSI-RS. Only the methods for determining the power in the three modes are different.

Situation three: When the third type of NZP CSI-RS/the third type of ZP CSI-RS collides with the second type of NZP CSI-RS, as shown in FIG. 4, the processing may be performed according to following modes.

Mode one: A reference signal with lower priority may be dropped according to priorities of signals colliding with each other. Preferably, the third type of NZP CSI-RS/the third type of ZP CSI-RS may be dropped, or the second type of NZP CSI-RS may be dropped. Alternatively, when the second type of NZP CSI-RS and one of third type of NZP CSI-RS belong to a same CSI process, the CSI process of the third type of NZP CSI-RS may be compared with the priority of the third type of NZP CSI-RS colliding with the second type of NZP CSI-RS, such as the CSI process ID may be compared. The reference signal with a small index value may be have a high priority.

Mode two: When the second type of NZP CSI-RS is a subset or universal set of the third type of NZP CSI-RS and the second type of NZP CSI-RS and the third type of NZP CSI-RS are sent from a same TP, Mode (a), when the second type of NZP CSI-RS and the third type of NZP CSI-RS have totally same resources and have same CSI processes, since it may be totally same to transmit the second type of NZP CSI-RS or the third type of NZP CSI-RS, it may be considered that there may be no collision between the second type of NZP CSI-RS and the third type of NZP CSI-RS. It should be noted that the totally same of the resources may be that the time-frequency resource may be the same, such as the CSI reference signal configuration may be the same, but the sequences may be different. For instance, although the second type of NZP CSI-RS and the third type of NZP CSI-RS may adopt the same $N_{ID}^{CSI}$, the second type of NZP CSI-RS may change at 0 ms and 5 ms, while the third type of NZP CSI-RS may change at each ms. Therefore, the sequences of the two types of NZP CSI-RS may be different. In this case, the second type of NZP CSI-RS or the third type of NZP CSI-RS may be transmitted. But, in essence, it may be considered that there may be no collision. The totally same of resources described herein may be that the time-frequency resources are the same, and the sequences are also the same.

Mode (b), the second type of NZP CSI-RS and the third type of NZP CSI-RS may correspond to different CSI processes. The resource mapping and the transmission power of the second type of NZP CSI-RS and the third type of NZP CSI-RS may be determined according to the mode (a), mode (b) or mode (c) in the situation two. The transmission power of the second type of NZP CSI-RS may be determined according to the second type of NZP CSI-RS.

However, the UE may assume that the third type of ZP CSI-RS colliding with the second type of NZP CSI-RS cannot be used to measure the interference. Alternatively, the UE may assume that the third type of ZP CSI-RS colliding with the second type of NZP CSI-RS may be used to measure the interference. When the interference computation is performed, the influence of the second type of NZP CSI-RS may be removed.

In order to enable the UE to determine whether the second type of NZP CSI-RS and the third type of ZP CSI-RS belong to a same TP, the base station may use signaling, such as Qualsi-colocated to indicate whether the second type of NZP CSI-RS and the third type of ZP CSI-RS belong to a same TP.

In another implementation method of embodiments of the present disclosure, the third type of NZP CSI-RS/the third type of ZP CSI-RS may be configured on a subframe and time-frequency resources in the subframe, which shall not be used to transmit the first type of PSS/SS and the first type of NZP CSI-RS/the second type of NZP CSI-RS, to avoid collision. It should be noted that the location of the DRS in the DMTC window may be uncertain. Therefore, when the resources are configured, the uncertainty of the location of the DRS should be considered.

Situation four: when the first type NZP CSI-RS collides with the DM-RS, as shown in FIG. 20, following processing modes may be adopted.

Mode one: when part of time-frequency resources of the DM-RS are overlapped with those of the first type of NZP CSI-RS, the DM-RS on the overlapped resource elements are not transmitted and the DM-RS on other resource elements are normally transmitted.

Mode two: when part of time-frequency resources of the DM-RS are overlapped with those of the first type of NZP CSI-RS, all DM-RSs in a same OFDM are not transmitted.

Mode three: when part of time-frequency resources of the DM-RS are overlapped with those of the first type of NZP CSI-RS, the DM-RS on the overlapped resource elements is not transmitted and the DM-RS, which is located at a same OFDM symbol as that of a DM-RS on the overlapped resource elements and has a same port as that of the DM-RS on the overlapped resource elements, is not transmitted.

Mode four: the base station does not schedule the PDSCH, which is transmitted based on the DM-RS. For instance, the base station schedules the PDSCH, which is transmitted based on the CRS. Therefore, the UE may assume that the DM-RS is not received.

In this embodiment of the present disclosure, the UE may determine whether the subframe includes the first type of PSS/SSS and the first type of NZP CSI-RS/the second type of NZP CSI-RS by performing blind detection for the DRS. Alternatively, the UE may determine whether the subframe includes the DRS via detecting an explicit signaling indication to determine whether the subframe includes the first type of PSS/SSS and the first type of NZP CSI-RS/the second type of NZP CSI-RS. The UE may determine whether the subframe includes the third type of NZP CSI-RS/ZP CSI-RS according to a high-layer signaling configuration and by detecting whether the base station has occupied the channel to transmit the data.

Embodiment Two

A base station may transmit DRSs using the LBT, which is faster than that for transmitting data. Therefore, transmission probability of the second type of NZP CSI-RS may be higher than that for transmitting the third type of NZP CSI-RS. However, since the minimum period of the DRS is 40 ms, the transmission period of the second type of NZP CSI-RS may be longer.

When a channel is busy, for instance the traffic of the WiFi on a same carrier is heavy, the transmission probability of the third type of NZP CSI-RS may be reduced. The base station may configure the second type of NZP CSI_RS, which may be used to assist the third type of NZP CSI-RS.

When both the second type of NZP CSI-RS and the third type of NZP CSI-RS are used to measure the CSI of the same TP, the second type of NZP CSI-RS and the third type of NZP CSI-RS may be configured as a same set of CSI process, which may be conducive to reduce the CSI process burden of the UE and obtain a more accurate CSI measurement result. Since when the second type of NZP CSI-RS is configured as a separate CSI process, as for non-periodic CSI report, the CSI process corresponding to the non-periodic CSI report triggered at most of time, which is out of the DMTC window, may probably have include the process of the second type of NZP CSI-RS, the value of CSI process reported by the UE may have been invalid. Even the CSI process is occupied by one type of signal, at least 40 ms (the minimum period of the DMTC window) is required to obtain a result, which may be the waste of the UE ability.

When one set or multiple sets of the second type of NZP CSI-RSs and one set or multiple sets of third type of NZP CSI-RSs are configured as belonging to a same CSI process, the UE may assume that the NZP CSI-RSs configured as belonging to the same CSI process may have the same transmission antenna port and have same channel fading characteristics. According to the implementation of the UE, the UE may combine or shall not combine estimated values of the multiple NZP CSI-RSs in the same CSI process.

In an aspect of the embodiment, the transmission power of the second type of NZP CSI-RS and the third type of NZP CSI-RS belonging to the same CSI process may be determined according to following modes.

In mode (1), when the second type of NZP CSI-RS and the third type of NZP CSI-RS belonging to the same CSI process are in a same DL transmission burst, the two types of NZP CSI-RSs may have the same power. Specifically, how to set the power of the two types of NZP CSI-RSs may be the implementation of the base station. As shown in FIG. 5, in the second DMTC window (DMTC window 2), the second type of NZP CSI-RS and the third type of NZP CSI-RS belong to a same DL transmission burst and the transmission power of the two types of NZP CSI-RSs is the same.

In mode (2), when the second type of NZP CSI-RS and the third type of NZP CSI-RS belonging to the same CSI process are not in the same DL transmission burst, the transmission power of the two types of NZP CSI-RSs may be different. When the base station has signaling indicating relative values of the power of the NZP CSI-RSs in different DL transmission bursts, the UE may measure the CSI using the NZP CSI-RSs in the multiple DL transmission bursts.

The base station may respectively configure Pcs for the two types of NZP CSI-RSs, may configure a set of Pc for the two types of NZP CSI-RSs, or not configure the Pc for the two types of NZP CSI-RSs. Refer to 36.213 7.2.5 Technical Specification (TS), the Pc may be an assumed reference PDSCH transmission power when the UE feeds back the CSI.

In another aspect of the embodiment, the signaling indicating that the second type of NZP CSI-RS and the third type of NZP CSI-RS belong to a same CSI process may be configured via following modes.

In mode (1), in MeasDS-Config of the DRS, only the process ID of the second type of NZP CSI-RS may be configured and resource Config, etc., of the second type of NZP CSI-RS shall not be explicitly configured. The UE may find the CSI process, which is the same as the process ID of the second type of NZP CSI-RS, in the MeasDS-Config via reading the CSI processing information in CQI configuration information. Therefore, the UE may determine the time-frequency resources (i.e., the resourceConfig), code words (i.e., scramblingIdentity) and number of antenna ports (i.e., antennaPortsCount) of the second type of NZP CSI-RS in the MeasDS-Config may be the same as all resources of the third type of NZP CSI-RS, the CSI process of which may be the same as that of the second type of NZP CSI-RS, in the CQI configuration information. The only difference may be that the NZP CSI-RS only may appear simultaneously with the DRS. The example of the configuration signaling may be shown hereinafter.

| MeasDS-Config information elements |
| --- |
| -- ASN1START<br>MeasDS-Config-r12 ::=    CHOICE {<br>    release    NULL,<br>    setup    SEQUENCE { |

-continued

| MeasDS-Config information elements |
|---|

```
    dmtc-PeriodOffset-r12           CHOICE {
        ms40-r12                        INTEGER(0..39),
        ms80-r12                        INTEGER(0..79),
        ms160-r12                       INTEGER(0..159),
        ...
    },
    ds-OccasionDuration-r12         CHOICE {
        durationFDD-r12                 INTEGER(1..maxDS-Duration-r12),
        durationTDD-r12                 INTEGER(2..maxDS-Duration-r12)
    },
    measCSI-RS-ToRemoveList-r12         MeasCSI-RS-ToRemoveList-r12
OPTIONAL,   -- Need ON
    measCSI-RS-ToAddModList-r12         MeasCSI-RS-ToAddModList-r12
OPTIONAL,   -- Need ON
    ...
  }
}
MeasCSI-RS-ToRemoveList-r12 ::= SEQUENCE                       (SIZE
(1..maxCSI-RS-Meas-r12)) OF MeasCSI-RS-Id-r12
MeasCSI-RS-ToAddModList-r12 ::= SEQUENCE                       (SIZE
(1..maxCSI-RS-Meas-r12)) OF MeasCSI-RS-Config-r12
MeasCSI-RS-Id-r12 ::=        INTEGER (1..maxCSI-RS-Meas-r12)
MeasCSI-RS-Config-r12 ::=    SEQUENCE {
    measCSI-RS-Id-r12           MeasCSI-RS-Id-r12,
    physCellId-r12              INTEGER (0..503),
    scramblingIdentity-r12         INTEGER (0..503),
    resourceConfig-r12          INTEGER (0..31),
    subframeOffset-r12          INTEGER (0..4),
    csi-RS-IndividualOffset-r12       Q-OffsetRange,
    ...
}
MeasCSI-RS-ToRemoveList-r13 ::= SEQUENCE                       (SIZE
(1..maxCSI-RS-Meas-r13)) OF MeasCSI-RS-Id-r13
MeasCSI-RS-ToAddModList-r13 ::= SEQUENCE                       (SIZE
(1..maxCSI-RS-Meas-r13)) OF MeasCSI-RS-Config-r13
MeasCSI-RS-Id-r13 ::=        INTEGER (1..maxCSI-RS-Meas-r13)
MeasCSI-RS-Config-r13 ::=    SEQUENCE {
    measCSI-RS-Id-r13           MeasCSI-RS-Id-r13
    csi-ProcessId-r13           csi-ProcessId-r11,
    ...
}
    -- ASN1STOP
```

In mode (2), resources (such as the resourceConfig, scramblingIdentity and antennaPortsCount) and a process ID of the second type of NZP CSI-RS may be explicitly configured in the MeasDS-Config. The UE may find a CSI process of a third type of NZP CSI-RS, the process ID of which may be the same as that of the second type of NZP CSI-RS in the MeasDS-Config via reading the CSI process information in the CQI configuration information and make a determination that the second type of NZP CSI-RS in the MeasDS-Config and the third type of NZP CSI-RS may belong to a same CSI process. An example of the configuration signaling may be as follows.

This mode may provide flexibility for the configuration of the base station. The second type of NZP CSI-RS and the third type of NZP CSI-RS may have different resources, but may have same antenna ports.

| MeasDS-Config information elements |
|---|

```
-- ASN1START
MeasDS-Config-r12 ::=        CHOICE {
    release                      NULL,
    setup                    SEQUENCE {
        dmtc-PeriodOffset-r12           CHOICE {
            ms40-r12                        INTEGER(0..39),
            ms80-r12                        INTEGER(0..79),
            ms160-r12                       INTEGER(0..159),
            ...
        },
        ds-OccasionDuration-r12         CHOICE {
            durationFDD-r12                 INTEGER(1..maxDS-Duration-r12),
            durationEDD-r12                 INTEGER(2..maxDS-Duration-r12)
        },
        measCSI-RS-ToRemoveList-r12         MeasCSI-RS-ToRemoveList-r12
OPTIONAL,   -- Need ON
```

-continued

| MeasDS-Config information elements |
|---|

```
    measCSI-RS-ToAddModList-r12     MeasCSI-RS-ToAddModList-r12
        OPTIONAL,   -- Need ON
        ...
    }
}
MeasCSI-RS-ToRemoveList-r12 ::= SEQUENCE                    (SIZE
(1..maxCSI-RS-Meas-r12)) OF MeasCSI-RS-Id-r12
MeasCSI-RS-ToAddModList-r12 ::= SEQUENCE                    (SIZE
(1..maxCSI-RS-Meas-r12)) OF MeasCSI-RS-Config-r12
MeasCSI-RS-Id-r12 ::=           INTEGER (1..maxCSI-RS-Meas-r12)
MeasCSI-RS-Config-r12 ::=           SEQUENCE {
    measCSI-RS-Id-r12               MeasCSI-RS-Id-r12,
    physCellId-r12                  INTEGER (0..503),
    scramblingIdentity-r12              INTEGER (0..503),
    resourceConfig-r12              INTEGER (0..31),
    subframeOffset-r12              INTEGER (0..4),
    csi-RS-IndividualOffset-r12         Q-OffsetRange,
    ...
}
MeasCSI-RS-ToRemoveList-r13 ::= SEQUENCE                    (SIZE
(1..maxCSI-RS-Meas-r13)) OF MeasCSI-RS-Id-r13
MeasCSI-RS-ToAddModList-r13 ::= SEQUENCE                    (SIZE
(1..maxCSI-RS-Meas-r13)) OF MeasCSI-RS-Config-r13
MeasCSI-RS-Id-r13 ::=           INTEGER (1..maxCSI-RS-Meas-r13)
MeasCSI-RS-Config-r13 ::=           SEQUENCE {
    measCSI-RS-Id-r13               MeasCSI-RS-Id-r13,
    csi-ProcessId-r13               csi-ProcessId-r11,
    physCellId-r13                  INTEGER (0..503),
    scramblingIdentity-r13              INTEGER (0..503), ...
}
```

No matter which of the above modes, ZP CSI-Interference Measurement (IM) resource configurations corresponding to the two types of NZP CSI-RSs, which may belong to the same CSI process, may be the same.

Embodiment Three

This embodiment may describe a method for transmitting the DRS in a DL transmission burst including data. Since a partial subframe described in this embodiment of the present disclosure may be an initial subframe or ending subframe of the DL transmission burst including data and the partial subframe does not occupy all Orthogonal Frequency Division Multiplexing (OFDM) symbols of the whole subframe. The subframe of the DL transmission burst of the DRS-only could be a normal or partial subframe. The partial subframe described in this embodiment of the present disclosure does not consider such DRS-only partial subframe.

Mode one: No matter whether the length of partial subframe is enough to transmit the DRS, the DRS shall not be transmitted with data in the partial subframe. The partial subframe may be used to perform other signal mapping according to structure of the Downlink Pilot Time Slot (DwPTS). As shown in FIG. 6, the UE assumes that the DRS cannot be detected in the partial subframe with data. The partial subframe includes an initial partial subframe and an ending partial subframe of the DL transmission burst.

It should be noted that the partial subframe follows the DwPTS subframe structure. As shown in FIG. 10, both the DwPTS subframe structure 1 and DwPTS subframe structure 2 does not include the second type of PSS/SSS. Therefore, when the subframe 0/5 is the partial subframe, the second type of PSS/SSS is not transmitted. When the subframe 0/5 is the complete subframe, the subframe structure of the subframe 0/5 is that of a normal subframe and the subframe 0/5 transmits the second type of PSS/SSS.

For example, the DRS may include the PSS/SSS occupying the last two OFDM symbols (i.e., the sixth OFDM symbol and the seventh OFDM symbol) of the first timeslot, the CRS occupying four OFDM symbols (i.e., the first and fifth OFDM symbols of the first timeslot and the first and fifth OFDM symbols of the second timeslot), and/or the first type of NZP CSI-RS and/or second type of NZP CSI-RS occupying the third and fourth OFDM symbols of the second timeslot. When length of the ending partial subframe of the DL transmission burst is less than 12, it is obvious that the base station cannot transmit the DRS. Similarly, as for the initial partial subframe of the DL transmission burst, it is obvious that the base station cannot transmit the DRS. When the length of the ending partial subframe of the DL transmission burst is larger than or equal to 12, the DRS may be borne. Since the base station has passed the CCA detection before the DL transmission burst, it is good for the base station to transmit the DRS in the subframe, such as the DRS is be directly transmitted without extra LBT. When the base station does not transmit the DRS in this subframe, the base station further needs to perform the LBT. When the channel in the DMTC window is always busy, the base station does not transmit the DRS. However, in order to transmit the DRS in this type of subframe, a new method for transmitting other signals such as DM-RS needs to be defined. Therefore, in order to keep implementation simple, a reasonable method is that the base station cannot transmit the DRS in the partial subframe no matter whether the length of the partial subframe is enough to transmit the DRS. In this case, the UE should assume that the DRS cannot be detected in the partial subframe.

The advantages for not transmitting the DRS in the partial subframe are avoiding the collision between the reference signal in the DRS and the signal in the partial subframe to some extent. Since the structure of the DwPTS is different from that of a normal subframe, the locations of the CSI-RS of a same resource configuration index are different. For instance, as shown in FIG. 7a, in the DwPTS subframe configuration 4, the CSI-RS occupying the third and fourth OFDM symbols of the first timeslot corresponds to the CSI-RS occupying the sixth and seventh OFDM symbols in a normal subframe. When the partial subframe transmits the DRS, such as the DRS occupies twelve OFDM symbols, the PSS/SSS/CRS/CSI-RS in the DRS should be mapped according to the structure of the normal subframe. When other signals of the partial subframe still adopt the DwPTS subframe structure, the PSS/SSS of the DRS, i.e., the first type of PSS/SSS will collide with the third type of NZP CSI-RS/the third type of ZP CSI-RS occupying the sixth and seventh OFDM symbols in the partial subframe and the CSI-RS in the DRS, i.e., the first kid of NZP CSI-RS or the second type of NZP CSI-RS will collide with the DM-RS and the third type of NZP CSI-RS occupying the tenth and eleventh OFDM symbols in the partial subframe. When in order to avoid collision, the subframe, in which the base station cannot likely to transmit the DRS, shall not be configured with the third type of NZP CSI-RS on these locations. For instance, eight REs in the third and fourth OFDM symbols of the DwPTS are configured as the third type of NZP CSI-RS. However, as shown in FIG. 7b, when the subframe is a normal subframe, the sixth and seventh OFDM symbols collide with the PSS/SSS of the DRS. Therefore, in order to completely avoid collision, the base station requires that the whole subframe or multiple subframes should not be configured with the third type of NZP CSI-RS, which causes huge waste to the CSI-RS resources.

When the length of the partial subframe is enough to transmit the DRS, when the base station is not allowed to transmit the DRS according to the mode one, the transmission probability of the DRS is reduced. In order to enhance the transmission probability of the DRS, the mode two may be adopted.

Mode two: When the length of the partial subframe is not enough to transmit the DRS, the DRS shall not be transmitted with data in the partial subframe and the partial subframe may be used to transmit signals according to the DwPTS subframe structure. When the length of the partial subframe is enough to transmit the DRS, the DRS may be transmitted with data and other signals may be transmitted according to the mode (a) or the mode (b). Therefore, the UE may assume that when the length of the partial subframe is enough to transmit the DRS, the partial subframe may include the DRS and the method for transmitting the other signals of the partial subframe may be determined according to the following mode (a) or mode (b).

In mode (a), other signals except for the DRS, such as DM-RS, the third type of CSI-RS/CSI-IM and data/control channel may be transmitted according to a method for transmitting normal DL subframes. As shown in FIG. 8, in the first DMTC window (such as DMTC window 1 as shown in the FIG. 8), the subframe 4 is the partial subframe, the length of the partial subframe is the length of eleven OFDM symbols, the subframe 4 is transmitted according to structure of the DwPTS and the base station does not transmit the DRS in the subframe 4. Simultaneously, the base station performs the LBT in the DMTC window 1 to try to transmit the DRS, preempt the subframe 8 and transmit the DRS in the subframe 8. In the next DMTC window (i.e., the DMTC window 2 in the FIG. 8), the subframe 4 is the partial subframe and the length of the subframe 4 is twelve OFDM symbols, the base station transmits the DRS in the subframe 4 of the DMTC window 2 and transmits other signals according to the structure of normal subframes in the subframe 4 of the DMTC window 2.

In mode (b), other signals except for the DRS may be transmitted according to the DwPTS subframe structure. When the first type of NZP CSI-RS collides with the DM-RS, the corresponding DM-RS may be dropped. As shown in FIG. 10, the first type of NZP CSI-RS is in the same OFDM symbol with DM-RS, i.e. 9th and 10th symbols. If the subcarriers of NZP CSI-RS and DM-RS are overlapped, the corresponding DM-RS is dropped. For instance, as shown in FIG. 10, when the subframe 0/5 is the partial subframe and the length of the subframe 0/5 is enough to transmit the DRS, for instance, the length of the partial subframe is 12, it can be seen that the tenth and eleventh OFDM symbols, at which the first type of NZP CSI-RS is located are the OFDM symbols, at which the DM-RS is located. The base station may configure the first type of NZP CSI-RS on any pair of subcarriers of these two symbols. Therefore, when the subcarrier, at which the first type of NZP CSI-RS is located, is same as that of the DM-RS, collision will occur. In this situation, the base station does not transmit the DM-RS colliding with the first type of NZP CSI-RS. The methods for the base station not to transmit the DM-RS colliding with the first type of NZP CSI-RS may be as follows.

Method one: when part of time-frequency resources of the DM-RS are overlapped with those of the first type of NZP CSI-RS, the DM-RS on the overlapped resource elements is not transmitted and the DM-RS on other resource elements is normally transmitted.

As shown in FIG. 20, assume that the base station transmits the DRS and data in the subframe and the length of the subframe is twelve OFDM symbols. The mapping of the DM-RS is determined according to the pattern of the DwPTS and it is assumed that there is DM-RS with two ports. The first type of NZP CSI-RS is transmitted on the twelfth subcarrier of each PRB of the tenth and eleventh OFDM symbols in the subframe. Therefore, the base station does not transmit the DM-RS on twelfth subcarriers of the each PRB of the tenth and eleventh OFDM symbols. However, the DM-RSs on other locations are transmitted, including the DM-RS on six subcarriers of the third and fourth OFDM symbols and the DM-RS transmitted on the other four subcarriers of the tenth and eleventh OFDM symbols. The UE may assume that when the DRS is detected and part of resources of the first type of NZP CSI-RS and resources of the DM-RS are overlapped, the first type of NZP CSI-RS is received on the corresponding resources, while the DM-RS is not received on the corresponding resources. Instead, the DM-RS is received on other resources.

Method two: when part of time-frequency resources of the DM-RS are overlapped with those of the first type of NZP CSI-RS, all DM-RSs in a same OFDM symbol are not transmitted.

As shown in FIG. 21, assume that the base station transmits the DRS and the data in the subframe and the length of the subframe is twelve OFDM symbols. The mapping of the DM-RS is determined according to the pattern of the DwPTS and it is assumed that there is DM-RS with four ports. The first type of NZP CSI-RS is transmitted on the twelfth subcarrier of each PRB of the tenth and eleventh OFDM symbols in the subframe. Therefore, the base station does not transmit the DM-RS in the two OFDM symbols, but transmits the DM-RS in the third and fourth OFDM symbols. The UE may assume that when the DRS is detected and part of resources of the first type of NZP CSI-RS and resources of the DM-RS are overlapped, the first type of NZP CSI-RS is received in a corresponding OFDM symbol, while the DM-RS is not received in the corresponding OFDM symbol. Instead, the DM-RS is received on other resources.

Method three: when part of time-frequency resources of the DM-RS are overlapped with those of the first type of NZP CSI-RS, the DM-RS on the overlapped resource elements is not transmitted and the DM-RS, which is in a same OFDM symbol as that of the DM-RS on the overlapped resource elements and has a same port as that of the DM-RS on the overlapped resource elements, is also not transmitted.

As shown in FIG. 22, assume that the base station transmits the DRS and the data in the subframe and the data in the subframe and the length of the subframe is twelve OFDM symbols. The mapping of the DM-RS is determined according to the pattern of the DwPTS and it is assumed that there is DM-RS with four ports. The first type of NZP CSI-RS is transmitted on the twelfth subcarrier of each PRB of the tenth and eleventh OFDM symbols in the subframe, is overlapped with the DM-RS of the port 7 and port 8, and is not overlapped with the DM-RS of the port 9 and port 10. Therefore, the base station does not transmit the DM-RS of the ports 7 and 8 in the two OFDM symbols, but transmits the DM-RS of the port 9 and port 10 and transmits the DM-RS of the ports 7 to 10 of the third and fourth OFDM symbols. The UE may assume that when the DRS is detected and partial resources of the first type of NZP CSI-RS and partial resources of the DM-RS are overlapped, the first type of NZP CSI-RS is received in a corresponding OFDM symbol, but the DM-RS of the ports 7 and 8 are not received. However, the DM-RS of the ports 9 and 10 is received and the DM-RS of the ports 7 to 10 is received on the third and fourth OFDM symbols.

Method four: the base station does not schedule the PDSCH, which is transmitted based on the DM-RS. For instance, the base station schedules the PDSCH, which is transmitted based on the CRS. Therefore, the UE may assume that the DM-RS cannot be received.

Preferably, the other signals except for the DRS are transmitted according to the DwPTS DL subframe structure. When the first type of NZP CSI-RS collides with the DM-RS, the corresponding first type of NZP CSI-RS is dropped.

Preferably, the other signals except for the DRS are transmitted according to the DwPTS DL subframe structure. When the base station configures the first type of NZP CSI-RS, the location, which may be used to transmit the DM-RS, should be avoided. For instance, the base station should not configure the first type of NZP CSI-RS on the first, second, sixth, seventh, eleventh and twelfth subcarriers in each PRB of the tenth and eleventh OFDM symbols.

Preferably, the other signals except for the DRS are transmitted according to the DwPTS DL subframe structure. The DM-RS is mapped according to the pattern of the DwPTS subframe structure 2 in the FIG. 10 to avoid the collision between the DM-RS and the first type of NZP CSI-RS. When the DM-RS collides with the first type of PSS/SSS, the DM-RS is not transmitted on the resource elements, which are used to transmit the PSS/SSS and the DM-RS may be transmitted on other time-frequency resource locations.

Preferably, the other signals except for the DRS are transmitted according to the DwPTS DL subframe structure. The UE may receives the DM-RS on the corresponding location and receive the first type of CSI-RS on the corresponding location.

In general, the above description applies to the situation that the base station not only transmits the DRS, but also transmits the data. When only the subframe 0/5 can be used to multiplex the data and the DRS, the above description may only apply to the subframe 0/5. Further, the above description may only apply to the subframe 0/5 in the DMTC window. When other subframes also can be used to multiplex the data the DRS, the above description also applies to the other subframes.

It should be noted that when the subframe 0/5 is the partial subframe and the length of the partial subframe is not enough to transmit the DRS, the DRS shall not be transmitted and the partial subframe is used to transmit signals according to the DwPTS subframe structure. As shown in FIG. 10, both the DwPTS subframe structure 1 and the DwPTS subframe structure 2 shall not include the second type of PSS/SSS.

Mode three: As for a subframe except for the subframe 0/5, when the subframe is the partial subframe, no matter whether the length of the partial subframe is enough to bear the DRS, the DRS cannot be transmitted with data in the partial subframe. Therefore, the UE assumes that the DRS does not appear in the non-subframe 0/5 with data. As for the subframe 0/5, when the subframe is the partial subframe, the UE assumes the method for receiving the signals according to the following mode (1) or mode (2).

In mode (1), when the subframe 0/5 is the partial subframe, the base station does not transmit the second type of PSS/SSS in the subframe 0/5 and when the length of the partial subframe is not enough to transmit the DRS, the DRS is not transmitted and the partial subframe is used to transmit signals according to the DwPTS subframe structure. It should be noted that in the DwPTS subframe structure, there is no PSS/SSS belonging to the first type or the second type.

When the length of the partial subframe is enough to transmit the DRS, the DRS is transmitted with data and other signals are transmitted according to the mode (a) or the mode (b) in the mode two. When the base station does not transmit the DRS in the subframe 0/5, the subframe 0/5 is used to transmit the signals according to the DwPTS subframe structure.

Therefore, when the base station does not transmit the DRS, there is no PSS/SSS belonging to the first type or the second type. On the contrary, when the base station transmits the PSS/SSS, the DRS must be transmitted. Other signals are transmitted according to the DwPTS subframe structure or the normal subframe structure. That is, the UE assumes that when the PSS/SSS is detected, DRS is detected. Certainly, when there is signaling explicitly indicating the DRS, the UE determines that there is no PSS/SSS when there is no DRS and there is the PSS/SSS when there is DRS.

When the base station transmits the DRS, other signals are transmitted according to the normal subframe structure or the DwPTS subframe structure.

The advantages of not transmitting the second type of PSS/SSS in the partial subframe 0/5 are that when a UE in a neighbor cell performs the RRM measurement and detects the PSS/SSS, the UE considers that the DRS may have been detected. Therefore, the UE defaults to that the CRS of the DRS and the CSI-RS for measuring the RRM may have been detected. However, the cell may have not transmitted four complete CRS symbols or have not transmitted the CSI-RS for measuring the RRM. Since the cell has not transmitted the DRS, the PSS/SSS detected by the UE is the second type of PSS/SSS. To prevent confusion to the UE, the transmission of the second type of PSS/SSS should be avoided.

When the UE of the serving cell may determine the length of the subframe 0/5 in the DMTC window, whether there is no DRS may be determined according to the length of the subframe 0/5. For instance, when the length of the subframe 0/5 is less than 12, it is sure that there is no the transmission of the DRS and the transmission of the second type of PSS/SSS. When the length of the subframe 0/5 is larger than or equal to 12, there may be the DRS or may be no DRS. When there is explicit signaling indicating the DRS, it is determined whether there is DRS through the signaling. When there is no explicit signaling indicating the DRS, the determination may be made via performing the blind detection for the DRS. Further, the transmission method of other signals may be determined.

In mode (2), when the subframe 0/5 is the partial subframe and is in the DMTC window, as shown in FIG. 9, the base station does not transmit the second type of PSS/SSS, and For DRS:

when the length of the subframe 0/5 is not enough to transmit the DRS, the DRS is not transmitted;

when the length of the subframe 0/5 is enough to transmit the DRS, the DRS may be transmitted with data and other signals may be transmitted according to the mode (a) or (b) in the mode two. When the base station does not transmit the DRS in the subframe 0/5, the subframe 0/5 may be used to transmit the signals according to the DwPTS subframe structure.

That is, the UE may assume that in the DMTC window, when the PSS/SSS is detected, it may be considered that the DRS is detected. Other signals may be received according to the subframe structure in the mode (a) or (b) in the mode two. When the PSS/SSS is not detected, it may be considered that DRS is not detected and other signals may be received according to the DwPTS subframe structure.

For second type of PSS/SSS:

When the subframe 0/5 is the partial subframe and is outside of the DMTC window, the signal may be transmitted according to the DwPTS subframe structure and the second type of PSS/SSS shall not be transmitted. Alternatively, when the length of the partial subframe 0/5 is enough to transmit the second type of PSS/SSS, the second type of PSS/SSS is transmitted; otherwise the second type of PSS/SSS is not transmitted and other signals is transmitted according to the DwPTS subframe structure.

The pattern showing that the partial subframe 0/5 adopts the DwPTS subframe structure and the subframe 0/5 adopts the normal subframe structure is shown in FIG. 10.

Mode four: No matter whether the length of the partial subframe 0/5 is enough to transmit the second type of PSS/SSS, the second type of PSS/SSS cannot be transmitted in the partial subframe 0/5. Other signals of the partial subframe 0/5 are transmitted according to the DwPTS subframe structure. That is, the UE assumes that the second type of PSS/SSS cannot be detected in the partial subframe 0/5 and other signals are received according to the DwPTS subframe structure.

In other words, when the UE detects the PSS/SSS in the partial subframe, the UE may consider that the DRS has been detected. Accordingly, when the base station transmits the PSS/SSS in the partial subframe, the PSS/SSS must be the first type of PSS/SSS. That is, the base station may have transmitted the DRS, which may include the first type of PSS/SSS, CRS of four OFDM symbols, the first type of NZP CSI-RS and the second type of NZP CSI-RS when the base station has been configured with these two types of NZP CSI-RS.

As for the UE in the serving cell, in the DMTC window, the PSS/SSS may be detected in the partial subframe 0/5. Further, the PSS/SSS must be the first type of PSS/SSS. That is, the UE detects the DRS when UE detects PSS/SSS in DMTC. While, outside of the DMTC window, the PSS/SSS cannot be detected in the partial subframe 0/5. It may be possible that the partial subframe 0/5 outside of the DMTC window may be in the DMTC window of the UE of the neighbor cell. In this case, the UE of the neighbor cell cannot detect any PSS/SSS in the partial subframe 0/5.

It should be noted that in the above four modes in this embodiment of the present disclosure, when the subframe is not explicitly limited to be the subframe in the DMTC window, the subframe described above may be the subframe in the DMTC window or the subframe outside of the DMTC window.

Embodiment Four

When the subframe 0/5 belongs to a DL transmission burst, the length of subframe 0/5 is enough for a complete DRS transmission and the subframe 0/5 is in the DMTC window, the DRS shall be transmitted in a subframe, which is not after the subframe 0/5, in the DMTC window. That is, the DRS shall be transmitted no later than the subframe in which the second type PSS/SSS is transmitted. That is, the transmission subframe of the DRS in the DMTC window is not after the subframe of the second type of PSS/SSS.

Accordingly, UE may assume the DRS is detected in a subframe, which is not after a subframe 0/5 in a DMTC window when a subframe 0/5 belongs to a Downlink (DL) transmission burst, the length of subframe 0/5 is enough to transmit a complete DRS and the subframe 0/5 is in the DMTC window.

Alternatively, the DRS is only transmitted in the subframe 0/5.

Accordingly, UE may assume the DRS is only detected in the subframe 0/5 when the subframe 0/5 belongs to the DL transmission burst, the length of subframe 0/5 to transmit a complete DRS and the subframe 0/5 is in the DMTC window;

Alternatively, when the base station starts to transmit the DL transmission burst prior to the DMTC window and the DL transmission burst lasts into the DMTC window, when the length of the first subframe in the DMTC window is enough to transmit the DRS, the base station may transmit the DRS in the first subframe of the DMTC window without extra LBT; when the length of the first subframe in the DMTC window is not enough to transmit the DRS, the base station may execute the LBT in the DMTC window and try to transmit the DRS.

Accordingly, UE may assume the DRS is detected in a first subframe when length of the first subframe in the DMTC window is enough to transmit the DRS, and when a communication node starts to transmit the DL transmission burst prior to the DMTC window and the DL transmission burst lasts into the DMTC window.

When the length of subframe 0/5 is enough for a complete DRS transmission, the subframe 0/5 may be a normal subframe or the subframe 0/5 is the partial subframe and the length of the subframe 0/5 is enough to transmit the complete DRS symbols.

It may assumed that at least for the normal subframe 0/5, after the base station passes the LBT, the base station will transmit a reference signal, structure of which is the same as the PSS/SSS/CRS of the DRS.

In the examples shown in the FIG. 11a and FIG. 11b, the base station has occupied the channel prior to the DMTC window and start to transmit the DL transmission burst in the subframe 2. The maximum channel occupancy time is 4 ms, so the transmission of the DL transmission burst lasts until the ending of the subframe 5. The subframe 5 is in the DMTC window. The base station must transmit the DRS in the subframe 5 and cannot transmit the DRS in the subframe after the subframe 5. Since as shown in FIG. 11a, when the base station transmits the DRS in the subframe 8 and the UE detects the second type of PSS/SSS of the subframe 5, the UE may misidentify the second type of PSS/SSS as the first type of PSS/SSS, i.e., the PSS/SSS of the DRS. Consequently, the UE performs the RRM measurement based on the CRS in subframe 5 and/or the first type of NZP CSI-RS and perform the CSI measurement based on the second type of NZP CSI-RS in subframe 5. However, the base station has not transmitted the DRS in the subframe 5, resulting in that the UE cannot perform correct RRM measurement and CSI measurement and cannot perform correct rate matching. Therefore, as shown in FIG. 11b, in this case, base station shall transmit the DRS in the subframe 5.

In the example shown in FIG. 12, the base station has occupied the channel prior to the DMTC window and starts to transmit the DL transmission burst in the subframe 3. The maximum channel occupancy time is 4 ms. Therefore, the transmission of the DL transmission burst lasts until the ending of the subframe 6. The subframes 4 to 6 are in the DMTC window. In this case, the base station must transmit the DRS in the subframe 5 or subframe 4 and cannot transmit the DRS in the subframe after the subframe 5. Alternatively, the base station only transmits the DRS in the subframe 5. On one hand, the advantages for the subframe 4 to transmit the DRS may be that when the UE is configured with the CSI measurement based on the CSI-RS of the DRS, the base station may obtain the CSI result earlier. On the other hand, the subframe 5 will transmit the second type PSS/SSS and the CRS of four OFDM symbols. In order to avoid transmitting the PSS/SSS in two consecutive subframes, it may be a reasonable choice to enable the base station to transmit the DRS in the subframe 5. When the subframes except for the subframe 0/5 do not permit the multiplexing of the data and DRS in the same subframe, in order to avoid that the subframe 4 cannot be used to transmit the data, it may be reasonable that the base station transmits the DRS in the subframe 5. However, the base station cannot transmit the DRS in the subframes 6 to 9 to avoid that the UE may misunderstand the transmission of the DRS. That is, the UE may assume that in the DMTC window, when the first PSS/SSS is detected, it may be considered that the DRS is detected.

When there is explicit signaling notifying the served UE of whether the current subframe includes the DRS, the UE does not misunderstand the transmission of the DRS. However, as for the UE in the neighbor cell, since it is only able to make the determination via performing blind detection for the PSS/SSS/CRS, it is impossible to indicate whether the current subframe includes the DRS via the explicit signaling. Therefore, in the above case, it may be impossible to transmit the DRS after the subframe 0/5 in the DMTC window.

Embodiment Five

In another aspect of embodiments of the present disclosure, when the DMTC window is configured, it should be avoided that the subframe 0 or subframe 5 is configured as the initial of the DMTC window.

In another aspect of the embodiments of the present disclosure, when users of a same cell are measured, a same DMTC window may be configured. That is, the configured DMTC window may be the cell-specific DMTC window, rather than the UE-specific DMTC window.

In another aspect of the embodiments of the present disclosure, the DMTC window information configured for the UEs in each cell may be shared among the cells.

Embodiment Six

When the UE measures the interference, specifically when the UE measures the interference in the DMTC window, when the UE detects the signal sent from the base station in the subframe in which the interference measurement resources are, the UE may further need to distinguish the type of the subframe and determine whether the subframe can be used to measure the interference.

Preferably, when the interference measurement corresponding to the configured CSI measurement needs to measure the interference in the DL transmission burst including the data, the UE may need to determine whether the subframe is the subframe in the DL transmission burst including the data or the subframe is a DRS-only subframe. For instance, when the subframe is the subframe, which is only used to transmit the DRS, in the DL transmission burst, i.e., the base station adopts the rapid LBT and only transmits the DRS, but does not transmit other signals in the DMTC window, and the interference measurement resources in the subframe cannot be used to measure the interference. For another instance, when the base station fails to occupy any channel to transmit any signal in the subframe, the interference measurement resources in the subframe cannot be used to measure the interference. The UE may determine whether the subframe is a subframe in the DL transmission burst including the data according to any of the following modes.

Mode one: when the UE receives DL scheduling information for scheduling the UE in the subframe or the UE receives signaling for indicating the DL transmission burst, such as the cell common signaling for indicating a parameter of the DL transmission burst, in the subframe, when the cell common signaling is received, the UE may determine that the subframe is the subframe in the DL transmission burst including the data and the UE may measure the interference on the interference measurement resources in the subframe.

Mode two: When the UE determines that the base station transmits the DL signal in a part of the subframe including the interference measurement resources, such as the UE determines that the previous subframe of the subframe and/or the next subframe of the subframe belong to a same DL transmission burst by detecting the CRS of the first OFDM symbol of the subframe, the UE may determine that the subframe also belongs to the DL transmission burst. For instance, the UE may detect that the base station may have transmitted the signal in the previous subframe and occupied a whole subframe, and the base station may start to transmit the signal from the first OFDM symbol in the current subframe. Therefore, the UE may assume that the current subframe and the previous subframe may belong to the same DL transmission burst. The UE may measure the interference on the interference measurement resources of the subframe.

Mode three: When the UE detects the signaling indicating the DL transmission burst in a subframe prior to the subframe and the signaling indicates the information of the DL transmission burst length. When the subframe is in the DL transmission burst, the UE may measure the interference on the interference measurement resources of the subframe.

As shown in FIG. 13, the base station occupies the channel via the rapid LBT in the DMTC window and transmits the DRS in the subframe 4 and shall not transmit other signals (called the DRS-only). Then, the base station passes the normal LBT in the last two OFDM symbols of the subframe 4, occupies the channel in the subframe 5 and starts to transmit the DL transmission burst including the data. When the resources configured by the base station for measuring the interference are in the subframe 4, the UE needs to determine whether the subframe 4 is the subframe, which is only used to transmit the DRS or the subframe 4 is the DL transmission burst including the data. When the subframe 4 is the subframe, which is only used to transmit the DRS, the subframe 4 cannot be used to measure the interference. When the subframe 4 is the DL transmission burst including the data, the subframe 4 can be used to measure the interference. Therefore, the UE determines whether the subframe 4 is the DL transmission burst including the data via the above mode one or mode two. Since in the subframe, which is only used to transmit the DRS, the base station does not transmit the signaling used to schedule the UE and does not transmit the signaling indicating the DL transmission burst. Therefore, the UE determines that the subframe 4 is the subframe, which is only used to transmit the DRS. Alternatively, the UE detects the subframe 3 and subframe 5 via the mode two. Since the UE does not detect the transmission operation of the base station in the subframe 3, such as detect the CRS and does not detect the scheduling signaling or the cell common signaling in the subframe 4, the UE cannot determine whether the subframe 4 is the DL transmission burst including the data and cannot be used to measure the interference in the subframe 4.

For another example, as shown FIG. 14, the subframe 4 is used to transmit the DRS and the subframes 3 to 6 belong to a DL transmission burst. Therefore, the UE makes the determination via the mode one, mode two or the mode three. For instance, when the UE detects the signaling indicating the DL transmission burst in the subframe 2 via the mode three and the signaling indicates that the length of the DL transmission burst is 4, the UE determines that the ending location of the DL transmission burst is not prior to the subframe 5 and the interference resources in the subframe 4 may be used to perform the measurement. For another example, when the UE detects that the subframe 3 is a complete DL subframe via the mode two and the subframe 4 starts to transmit the signal from the first symbol, the UE may determine that the subframe 4 may be used to perform the measurement. Alternatively, the UE may detect that the base station may transmit the signal in the subframes 3 to 5, the UE may determine that the subframes 3 to 5 may belong to the same DL transmission burst and the UE may determine that the measurement may be performed in the subframe 4.

As shown in FIG. 15, the UE detects that the base station only transmits the signal in the subframe 4, does not detect that the base station transmits the signal in the previous subframe and next subframe, which are adjacent to the subframe 4, and does not detect the signaling used to schedule the UE or the signaling for indicating the DL transmission burst in the subframe 4, the UE may consider that the subframe 4 is only used to transmit the DRS, but cannot be used to measure the interference.

In general, outside of the DMTC window, the UE does not need distinguish whether the DL transmission burst is the one only used to transmit the DRS or the one including the data. Once the UE detects that the base station has transmitted the CRS, the UE may consider that the DL transmission burst may be the DL transmission burst including the data. In the DMTC window, the UE needs to distinguish whether the DL transmission burst is the one only used to transmit the DRS or the one including the data.

Corresponding to the above method, embodiments of the present disclosure may further provide a device for transmitting signals. As shown in FIG. 16, the device may include: a collision determination module such as a controller, a processor, etc., and a signal transmission module such as a transmitter, a transceiver, etc.

The collision determination module may be to determine whether resources of a Discovery Reference Signal (DRS) and resources of other types of reference signals are overlapped; and the signal transmission module may be to select at least one type of signal from the DRS and the other types of reference signals according to a predefined mode and transmit the selected signal when the resources of the DRS and the resources of the other types of reference signals are overlapped.

Corresponding to the above method, embodiments of the present disclosure may further provide a device for receiving signals. As shown in FIG. 17, the device may include: a collision determination module such as a controller, a processor, etc., and a signal receiving module such as a receiver, a transceiver, etc.

The collision determination module may be to determine whether resources of a Discovery Reference Signal (DRS) and resources of other types of reference signals are overlapped; and the signal receiving module may be to receive a signal according to a predefined mode when the resources of the DRS and the resources of the other types of reference signals are overlapped.

Corresponding to the above method, embodiments of the present disclosure may further provide a device for configuring reference signals. As shown in FIG. 18, the device may include: a determination module and a configuration module such as a controller, a processor, etc.

The determination module may be to determine to configure at least one set of a second type of Non-Zero Power (NZP) Channel State Information-Reference Signal (CSI-RS); and the configuration module may be to make a configuration, in which the at least one set of the second type of NZP CSI-RS and at least one set of a third type of NZP CSI-RS belong to a same CSI process.

Corresponding to the above method, embodiments of the present disclosure may further provide a device for measuring interference. As shown in FIG. 19, the device may include: subframe type determination module and an interference measurement module such as a controller, a processor, etc.

The subframe type determination module may be to determine, in a subframe configured with interference measurement resources, a type of the subframe when detecting that a base station transmits a signal; and the interference measurement module may be to measure the interference in the subframe when the subframe is a subframe, which is able to measure the interference.

The foregoing description may only describe preferred embodiments of the present invention and may not be used for limiting the protection scope thereof. Any modification, equivalent substitution, or improvement made without departing from the spirit and principle of the present invention should be covered by the protection scope of the present invention.

The invention claimed is:

1. A method by a base station for transmitting a discovery reference signal (DRS) in a wireless communication system, the method comprising:
   identifying a plurality of subframes for licensed-assisted access (LAA);
   identifying a DRS subframe in the plurality of subframes; and
   transmitting, to a terminal, a DRS in the identified DRS subframe,
   wherein the DRS subframe is identified as a first subframe including at least one of a primary synchronization signal (PSS), a secondary synchronization signal (SSS) or cell-specific reference signals (CRSs) within a discovery reference signal measurement timing configuration (DMTC) window among the plurality of subframes, and
   wherein the DRS subframe is not after a downlink (DL) transmission burst subframe including at least one of subframe 0 or 5 in a radio frame associated with the plurality of subframes in which simultaneous transmission of a DRS and data occurs in case that the DL transmission burst subframe is within the DMTC window and includes at least 12 OFDM symbols for transmitting the DRS.

2. A method by a terminal for receiving a discovery reference signal (DRS) in a wireless communication system, the method comprising:
   receiving, from a base station, at least one DRS candidate signal in a plurality of subframes for licensed-assisted access (LAA), the at least one DRS candidate signal including at least one of a primary synchronization signal (PSS), a secondary synchronization signal (SSS) or cell-specific reference signals (CRSs) in the plurality of subframes;
   identifying a DRS subframe as a first subframe including the at least one DRS candidate signal within a discovery reference signal measurement timing configuration (DMTC) window among the plurality of subframes; and
   receiving, from the base station, a DRS in the identified DRS subframe from the base station,
   wherein the DRS subframe is not after a downlink (DL) transmission burst subframe including at least one of subframe 0 or 5 in a radio frame associated with the plurality of subframes in which simultaneous transmission of a DRS and data occurs in case that the DL transmission burst subframe is within the DMTC window and includes at least 12 OFDM symbols for transmitting the DRS.

3. A base station for transmitting a discovery reference signal (DRS) in a wireless communication system, comprising:
   a transceiver configured to transmit and receive signals to and from a terminal; and
   a processor configured to:
      identify a plurality of subframes for licensed-assisted access (LAA);
      identify a DRS subframe in the plurality of subframes, and
      transmit, to the terminal via the transceiver, a DRS in the identified DRS subframe,
   wherein the DRS subframe is identified as a first subframe including at least one of a primary synchronization signal (PSS), a secondary synchronization signal (SSS) or cell-specific reference signals (CRSs) within a discovery reference signal measurement timing configuration (DMTC) window among the plurality of subframes, and
   wherein the DRS subframe is not after a downlink (DL) transmission burst subframe including at least one of subframe 0 or 5 in a radio frame associated with the plurality of subframes in which simultaneous transmission of a DRS and data occurs in case that the DL transmission burst subframe is within the DMTC window and includes at least 12 OFDM symbols for transmitting the DRS.

4. A terminal for detecting a discovery reference signal (DRS) in a wireless communication system, comprising:
   a transceiver configured to transmit and receive signals to and from a base station; and
   a processor configured to:
      receive, from the base station via the transceiver, at least one DRS candidate signal in a plurality of subframes for licensed-assisted access (LAA), the at least one DRS candidate signal including at least one of a primary synchronization signal (PSS), a secondary synchronization signal (SSS) or cell-specific reference signals (CRSs) in the plurality of subframes,
      identify a DRS subframe as a first subframe including the at least one DRS candidate signal within a discovery reference signal measurement timing configuration (DMTC) window among the plurality of subframes, and
      receive, from the base station via the transceiver, a DRS in the identified DRS subframe from the base station,
   wherein the DRS subframe is not after a downlink (DL) transmission burst subframe including at least one of subframe 0 or 5 in a radio frame associated with the plurality of subframes in which simultaneous transmission of a DRS and data occurs in case that the DL transmission burst subframe is within the DMTC window and includes at least 12 OFDM symbols for transmitting the DRS.

* * * * *